(12) United States Patent
Stearns et al.

(10) Patent No.: US 9,811,997 B2
(45) Date of Patent: Nov. 7, 2017

(54) MOBILE SAFETY PLATFORM

(71) Applicant: Driven by Safety, Inc., Smyrna, GA (US)

(72) Inventors: Rodney Stearns, Atlanta, GA (US); Scott Martin, San Diego, CA (US); Deepak Sundar, New York, NY (US)

(73) Assignee: Driven by Safety, Inc., Smyrna, GA (US)

( * ) Notice: Subject to any disclaimer, the term of this patent is extended or adjusted under 35 U.S.C. 154(b) by 0 days.

(21) Appl. No.: 14/984,693

(22) Filed: Dec. 30, 2015

(65) Prior Publication Data
US 2016/0196737 A1    Jul. 7, 2016

Related U.S. Application Data

(60) Provisional application No. 62/099,226, filed on Jan. 2, 2015.

(51) Int. Cl.
| | |
|---|---|
| *G08B 25/01* | (2006.01) |
| *H04N 5/76* | (2006.01) |
| *G08B 21/02* | (2006.01) |
| *G08B 25/10* | (2006.01) |
| *H04W 4/22* | (2009.01) |
| *H04N 5/77* | (2006.01) |

(52) U.S. Cl.
CPC ........... *G08B 25/016* (2013.01); *G08B 21/02* (2013.01); *G08B 25/10* (2013.01); *H04N 5/76* (2013.01); *H04N 5/77* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 6,726,636 B2 * | 4/2004 | Der Ghazarian .... | B60K 28/063 422/84 |
| 8,381,573 B2 | 2/2013 | Keays | |
| 8,560,010 B2 | 10/2013 | Koehn | |

(Continued)

FOREIGN PATENT DOCUMENTS

CN    103594003    2/2014

OTHER PUBLICATIONS

Martin, Scott; International Search Report and Written Opinion for serial No. PCT/US2015/068115, filed Dec. 30, 2015, mailed Mar. 11, 2016, 9 pgs.

(Continued)

*Primary Examiner* — Fekadeselassie Girma
(74) *Attorney, Agent, or Firm* — Taylor English Duma LLP

(57) ABSTRACT

A system for monitoring a safety condition of a user includes: a hero device; a measuring device; and a mobile device, the mobile device comprising a processor and a memory device, the memory device configured to store a safety mobile application enabling the mobile device to: record a video recording of the user using the measuring device during a measuring period, receive, from the measuring device, user data measured by the measuring device of the user during the measuring period, transmit, to a server, the user data and video recording of the user from the measuring period, and transmit, to the hero device, a status report message comprising the user data and video recording of the user from the measuring period.

7 Claims, 14 Drawing Sheets

(56) References Cited

U.S. PATENT DOCUMENTS

| | | | |
|---|---|---|---|
| 2002/0084130 A1* | 7/2002 | Der Ghazarian | B60K 28/063 180/272 |
| 2003/0146841 A1 | 8/2003 | Koenig | |
| 2006/0182661 A1* | 8/2006 | Aquila | B60K 28/063 422/84 |
| 2007/0093725 A1* | 4/2007 | Shaw | A61B 5/097 600/543 |
| 2008/0042825 A1* | 2/2008 | Denny | G08G 1/205 340/522 |
| 2008/0214142 A1 | 9/2008 | Morin | |
| 2009/0060287 A1 | 3/2009 | Hyde | |
| 2010/0012417 A1* | 1/2010 | Walter | B60K 28/063 180/272 |
| 2010/0223581 A1* | 9/2010 | Manolescu | G06Q 10/00 715/853 |
| 2011/0032096 A1 | 2/2011 | Miller et al. | |
| 2011/0161116 A1* | 6/2011 | Peak | G06Q 40/08 705/4 |
| 2011/0213628 A1* | 9/2011 | Peak | G06Q 40/08 705/4 |
| 2012/0041675 A1* | 2/2012 | Juliver | G06Q 10/08 701/465 |
| 2012/0127157 A1* | 5/2012 | Adler | A61B 5/0022 345/419 |
| 2012/0283894 A1* | 11/2012 | Naboulsi | A61B 5/18 701/1 |
| 2012/0289791 A1* | 11/2012 | Jain | A61B 5/4848 600/301 |
| 2013/0054011 A1* | 2/2013 | Holman | G06Q 10/10 700/232 |
| 2013/0054090 A1 | 2/2013 | Shin et al. | |
| 2013/0080843 A1* | 3/2013 | Stergiou | G06F 11/14 714/49 |
| 2013/0084903 A1 | 4/2013 | Harris, Jr. | |
| 2014/0057590 A1 | 2/2014 | Romero | |
| 2014/0162590 A1 | 6/2014 | Diperna | |
| 2014/0167954 A1* | 6/2014 | Johnson | G08B 27/001 340/539.11 |
| 2014/0227671 A1* | 8/2014 | Olmstead | G11B 27/10 434/308 |
| 2014/0335905 A1* | 11/2014 | Bhoot | H04W 4/02 455/466 |
| 2015/0057881 A1* | 2/2015 | Raab | H04M 1/72536 701/36 |
| 2015/0206419 A1* | 7/2015 | Johnson | G08B 25/009 340/936 |
| 2016/0081587 A1* | 3/2016 | Ghazarian | A61B 5/082 600/301 |

OTHER PUBLICATIONS

Martin, Scott; Provisional Patent Application entitled: Mobile Safety Platform having U.S. Appl. No. 62/099,226, fled Jan. 2, 2015, 26 pgs.

Apple, Inc.; Article entitled: "R-U-Buzzed? BAC Calculator", located at https://itunes.apple.com/us/app/r-u-buzzed-ac-calculator/id338979239?mt=8, accessed on Dec. 19, 2014, 3 pgs.

Apple, Inc.; Article entitled: DrinkTracker Breathalyzer, located at https://itunes.apple.com/app/drinktracker-breathalyzer/id316993951?mt=8, accessed on Dec. 19, 2014, 3 pgs.

BACtrack; Article entitled: BACtrack Encourages Consumers to Drink Smarter with Launch of BACtrack Vio Smartphone Breathalyer, located at http://www.prnewswire.com/news-releases/bactrack-encourages-consumers-to-drink-smarter-with-launch-of-bactrack-vio-smartphone-breathalyzer-267149881.html, accessed on Dec. 19, 2014, 3 pgs.

Baker, Natasha; Article entitled: "App lets you drink without worrying about hailing a cab", located at http://www.torontosun.com/2013/09/17/app-lets-you-drink-without-worrying-about-hailing-a-cab, Sep. 17, 2013, 3 pgs.

Butcher, Mike; Article entitled: "Clever bSafe Panic Alarm App Launches in U.S. with Free Offer to New Yorkers", located at http://techcrunch.com/2012/06/26/clever-bsafe-panic-alarm-app-launches-in-us-with-free-offer-to-new-yorkers, accessed on Dec. 19, 2014, 9 pgs.

Kindelan; Katie; Article entitled: "Panic Button iPhone/Android App Lets Kids Alert Families ASAP", located at http://socialtimes.com/panic-button-iphoneandroid-app-lets-kids-alert-families-asap_b58111, accessed on Dec. 19, 2014, 3 pgs.

Red Panic Button; Article entitled: Features—Red Panic Button app—press when in trouble—for Android and iPhone, located at http://www.redpanicbutton.com/features.html, accessed on Dec. 19, 2014, 3 pgs.

Wheaton, Dave; Article entitled: "Mobile App Allows Parents to Either Keep Kids Safe or Follow Their Every Move (Update)", located at http://mix925abilene.com/mobile-app-allows-parents-to-either-keep-kids-safe-or-follow-their-every-move/, published on Aug. 19, 2014, 2 pgs.

Woollaston, Victoria; Article entitled: "Turn your phone into a Panic Button: App Alerts friends and family if you're in danger—and even tracks your location on a map", located at http://www.dailymail.co.uk/sciencetech/article-2622230/Turn-phone-PANIC-BUTTON-App-alerts-friends-family-youre-danger-tracks-location-map.html, accessed on Dec. 19, 2014, 16 pgs.

Martin, Scott; International Preliminary Report on Patentability for Patent Application Serial No. PCT/US2015/068115, filed Dec. 30, 2015, dated Jul. 13, 2017, 8 pgs.

* cited by examiner

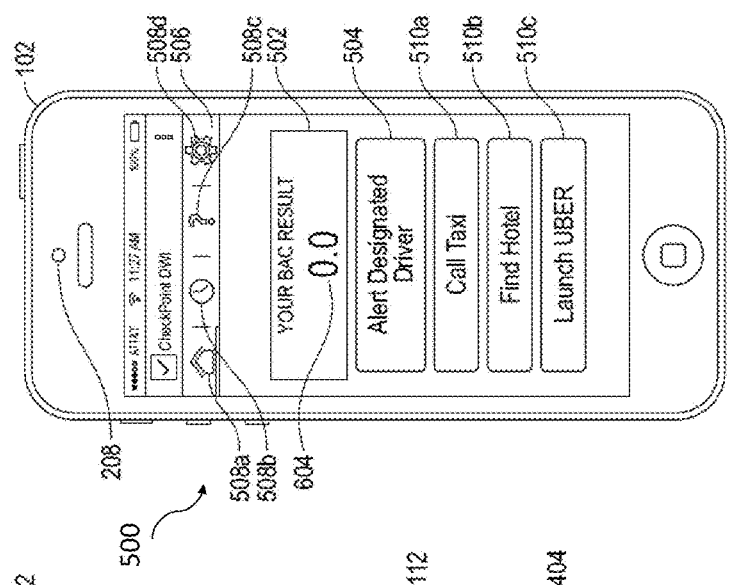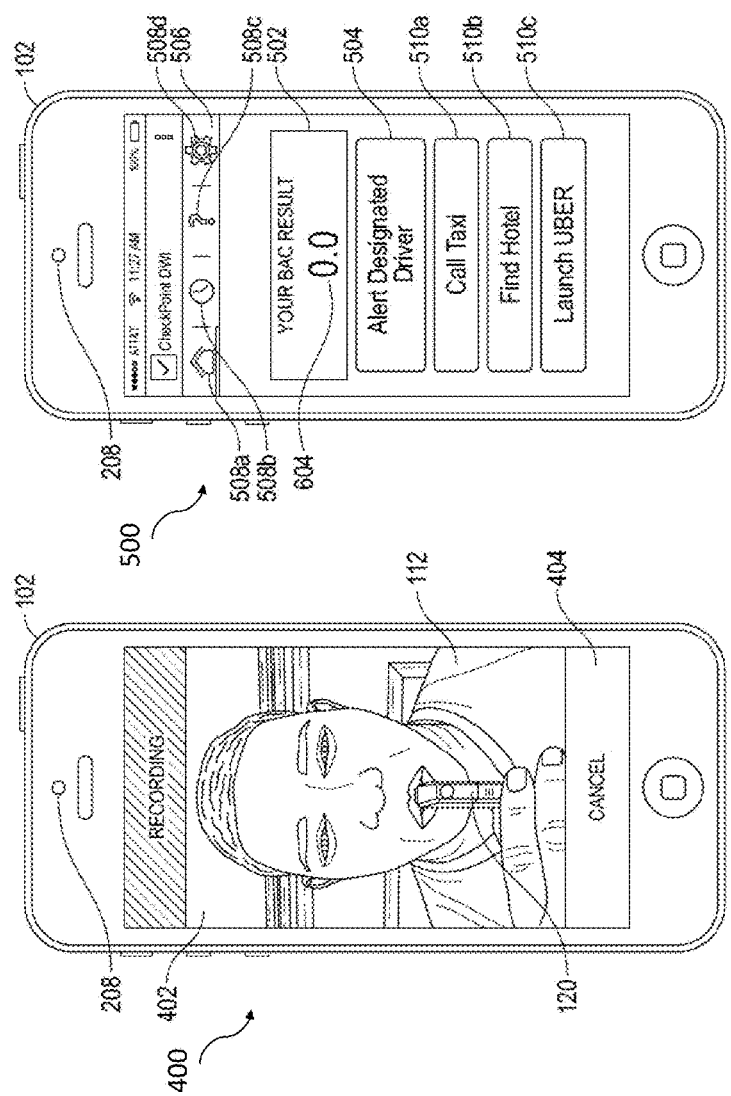

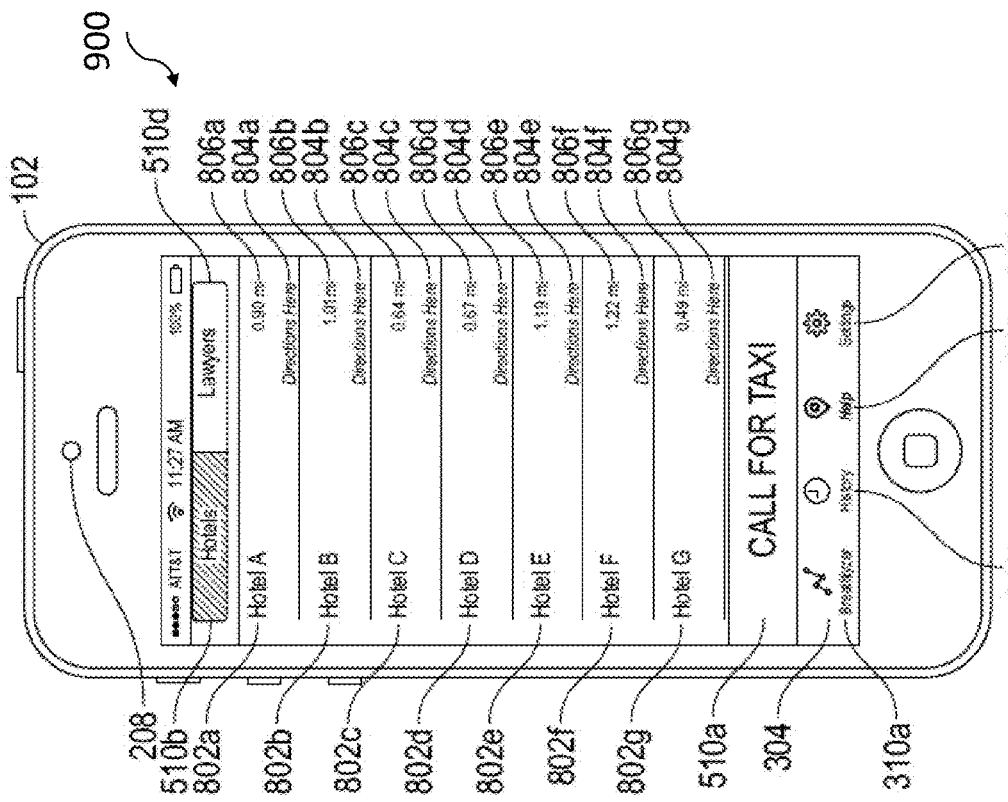
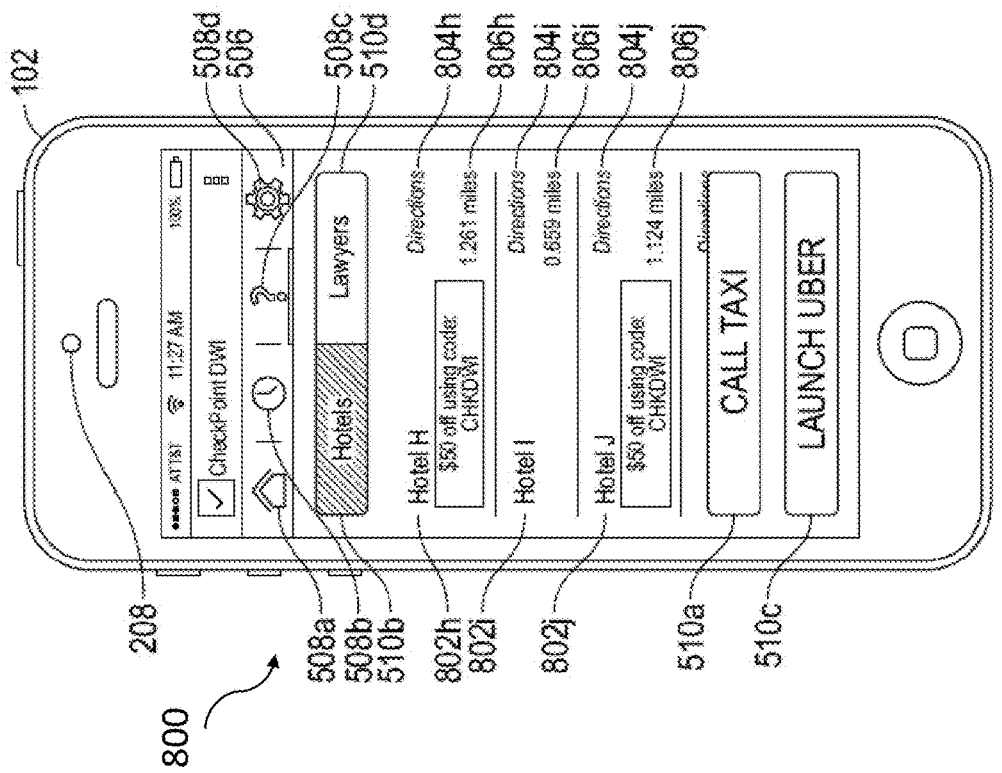
FIG. 9
FIG. 8

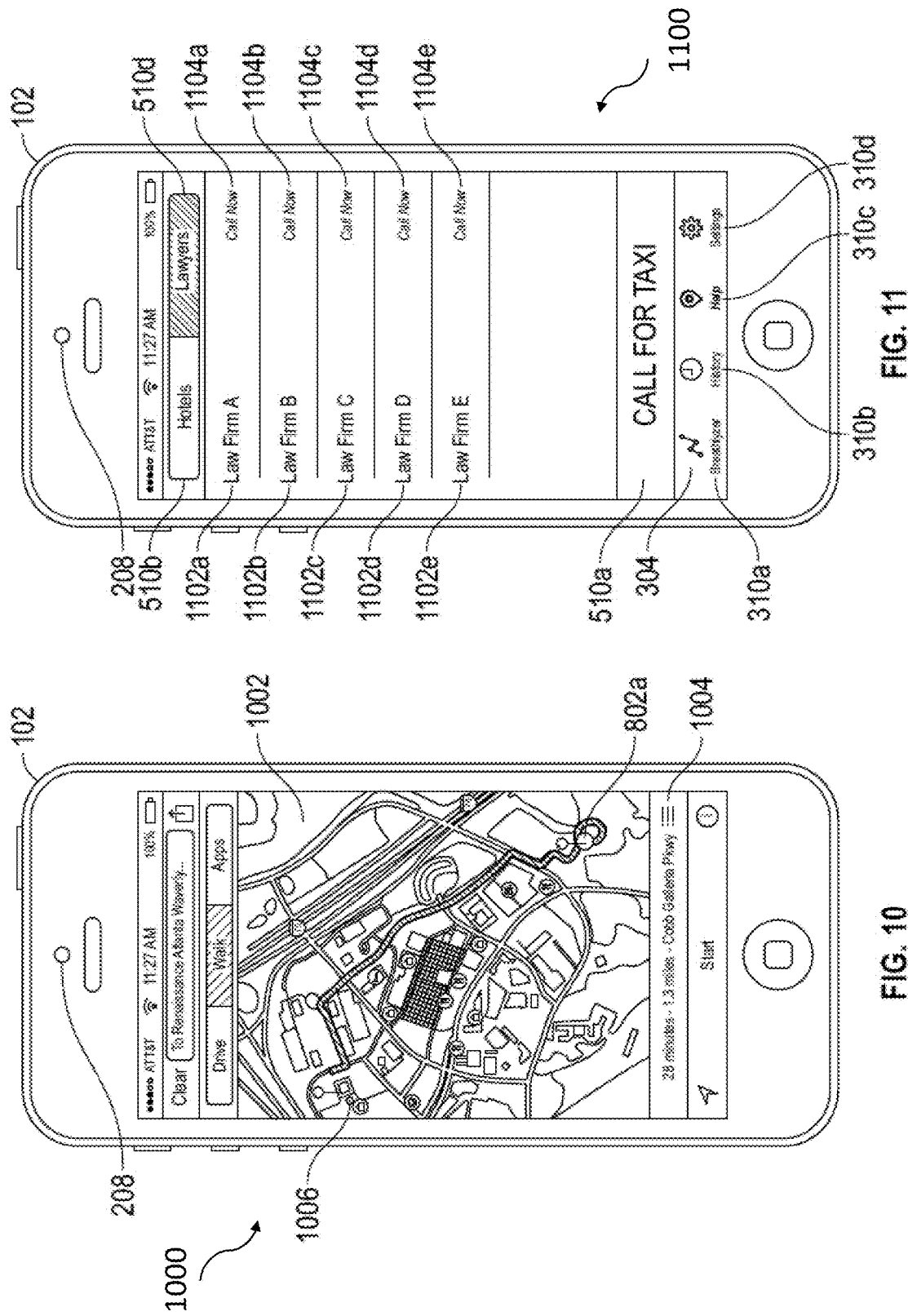

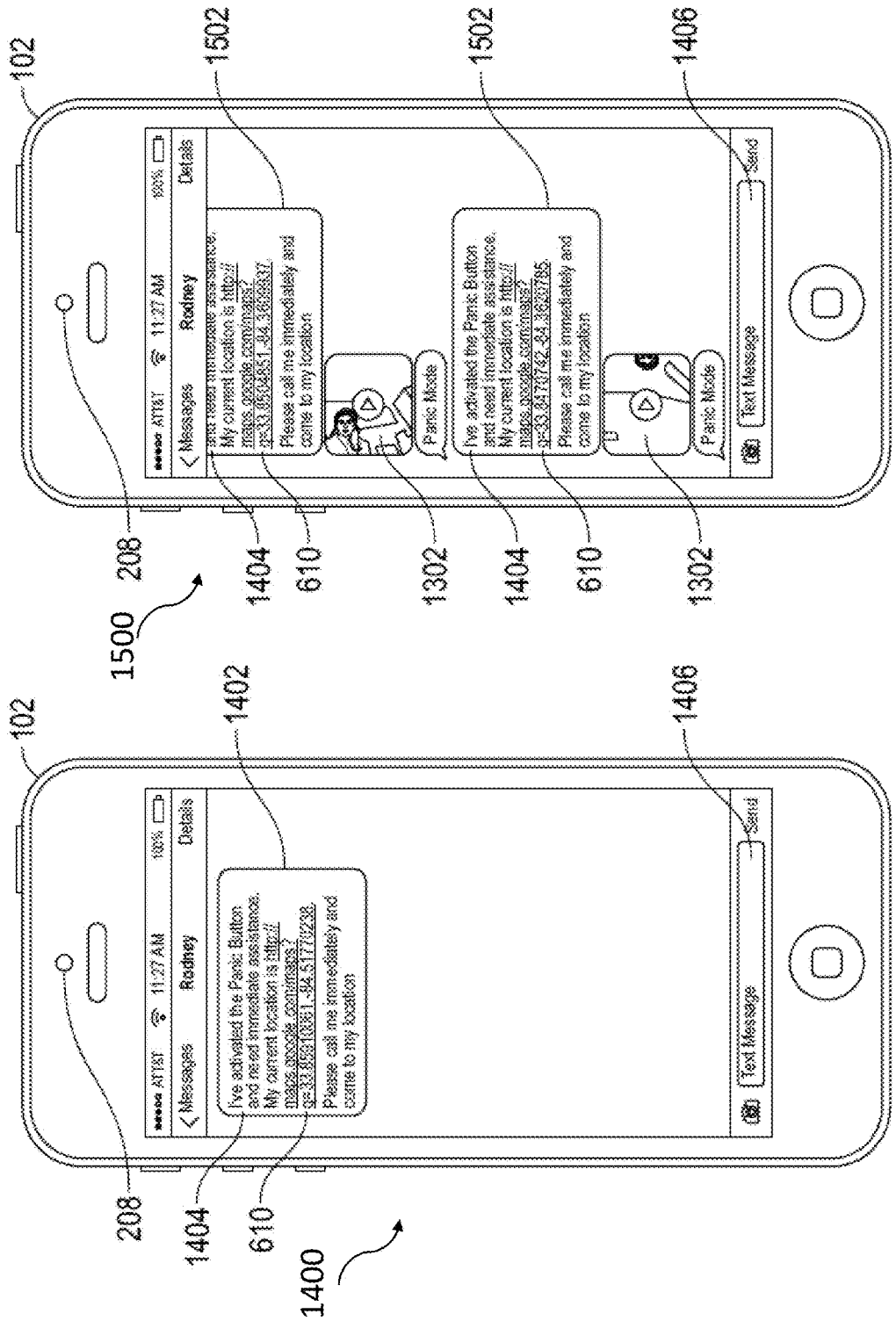

MOBILE SAFETY PLATFORM

REFERENCE TO RELATED APPLICATIONS

This application claims the benefit of U.S. Provisional Application No. 62/099,226, filed Jan. 2, 2015, which is hereby specifically incorporated by reference in its entirety.

TECHNICAL FIELD

This disclosure relates to mobile application systems. More specifically, this disclosure relates to mobile application systems having a safety platform.

BACKGROUND

In general, this disclosure relates to techniques to provide a safety mobile application to enable a user to monitor and record safety related information and facilitate communication of this safety related information between the user and another party.

SUMMARY

Disclosed is a system for monitoring a safety condition of a user, the system including: a hero device; a measuring device; and a mobile device, the mobile device including a processor and a memory device, the memory device configured to store a safety mobile application enabling the mobile device to: record a video recording of the user using the measuring device during a measuring period, receive, from the measuring device, user data measured by the measuring device of the user during the measuring period, transmit, to a server, the user data and video recording of the user from the measuring period, and transmit, to the hero device, a status report message including the user data and video recording of the user from the measuring period.

Also disclosed is a system for monitoring a safety condition of a user, the system including: a hero device; and a mobile device associated with the user, the mobile device including a processor and a memory device, the memory device configured to store a safety mobile application enabling the mobile device to: receive, from the user, an indication of an emergency situation, record a video of the user in the emergency situation, determine a geolocation of the mobile device, and communicate to the hero device a message including the video of the user in the emergency situation and the geolocation of the mobile device Also disclosed is a method of monitoring a safety condition of a user, the method including: receiving from the user an indication of an emergency situation; recording a video of the user in the emergency situation; determining a geolocation of a mobile device associated with the user; and communicating a message to a hero device, the message including the video of the user in the emergency situation and the geolocation of the mobile device.

Various implementations and examples described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims. It should be appreciated that the disclosed safety mobile application and associated techniques including methods, systems, devices, and various apparatuses is described in several examples among many. No particular terminology or description should be considered limiting on the disclosure or the scope of any claims issuing therefrom.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

FIGS. 2-19 illustrate example user interface screenshots according to example embodiments of the present disclosure.

DETAILED DESCRIPTION

The following description is presented to enable one skilled in the art to make and use the elements of the disclosure and is provided in the context of particular applications and their requirements. Thus, the following description of examples consistent with the present disclosure provides illustration and description but is not intended to be exhaustive or limiting to the precise form disclosed. Various modifications to the disclosed examples will be apparent to those skilled in the art, and the general principles set forth below may be applied to other examples and applications. For example, although a series of acts, features, or elements may be described with reference to a flow diagram, the order of such acts, features, or elements may differ in other implementations when the performance of one act is not dependent on the completion of another act. Further, non-dependent acts may be performed in parallel. No element, act or instruction used in the description should be construed as critical or essential to any example disclosed herein unless explicitly described as such. Also, as used herein, the article "a" is intended to include one or more items. Where only one item is intended, the term "one" or similar language is used. Thus, the present disclosure is not intended to be limited to the examples illustrated and described.

Figure 1A:
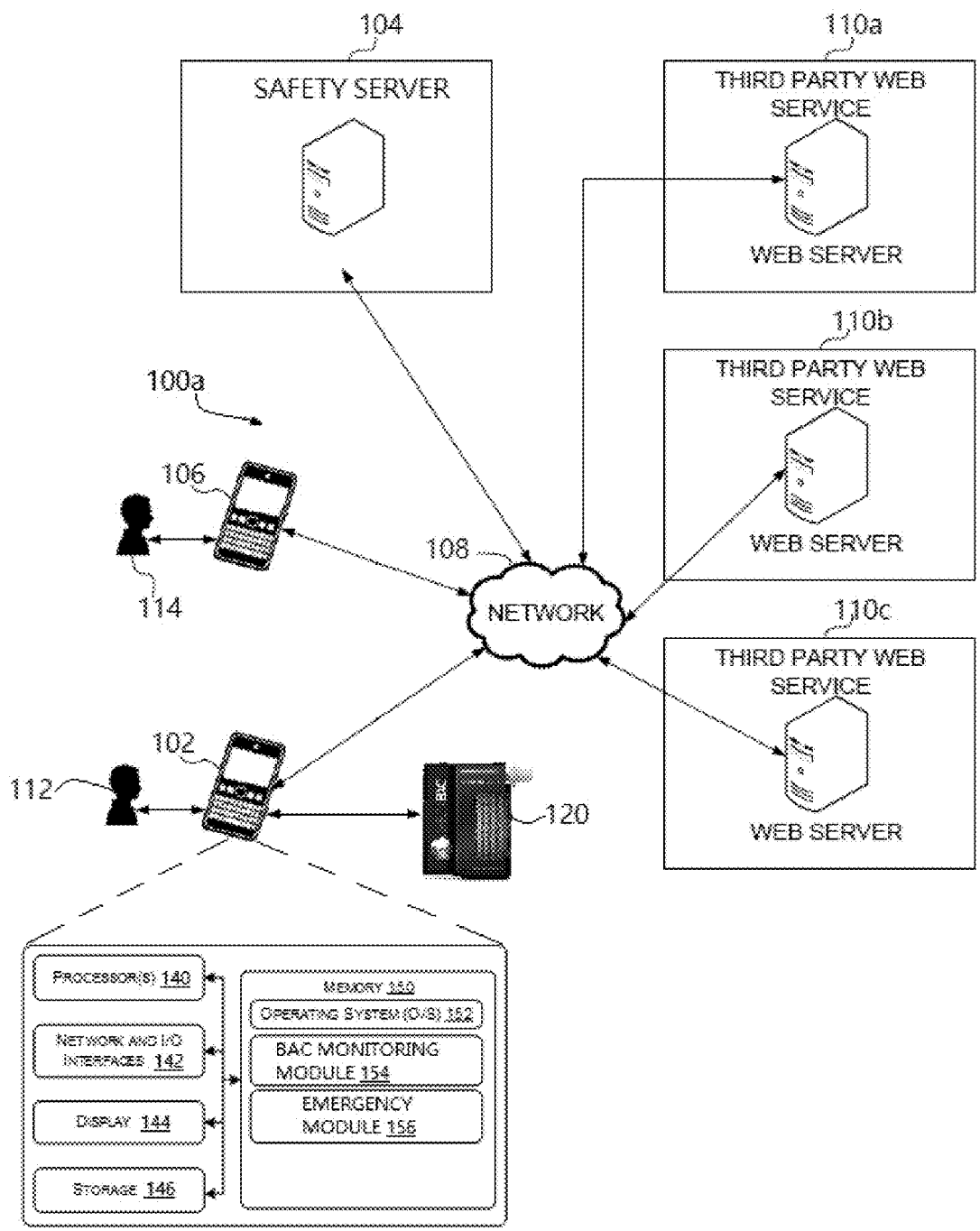
FIG. 1A illustrates one example of a system employed for implementing a safety mobile application according to an example of the present disclosure.

FIG. 1A illustrates a simplified communication system 100a for the receiving, storing, transmitting, and utilization of a safety condition of a user 112. Not all of the depicted components may be required, however, and some systems may include additional, different, or fewer components not illustrated in the figures. Variations in the arrangement and the type of components may be made without departing from the spirit or scope of the claims as set forth herein.

As illustrated in FIG. 1A, in various examples, the system 100a includes a user device 102 and a safety server 104. In various examples, the system 100a includes a hero device 106, which is a third party device. The system 100a may also include service providers 110a,b,c. The number of hero devices 106 or service providers 110 should not be considered limiting on the current disclosure. In various examples, the user device 102 and hero 106 are mobile devices including any appropriate type of computing system and/or computing device, including, but not limited to, a mobile phone, a tablet, a laptop, a smartphone, a feature phone, a personal digital assistant, a media player, an electronic book reader, a wearable computing device, a smart display, or any other similar device. As illustrated in FIG. 1A, in various examples the user device 102 is communicatively coupled with the safety server 104, the hero 106, and the service providers 110a,b,c via a network 108. The network 108 may be the Internet, a Wide Area Network (WAN), a Local Area Network (LAN), a Wireless Local Area Network (WLAN), or any other similar type of network or combination thereof. As used herein, the phrase "coupled with" includes communications where two devices are directly connected to or indirectly connected through one or more intermediate components. Such intermediate components may include both hardware, software, or network based components. Variations in the arrangement and the type of components may be made without departing from the spirit or scope of the claims as set forth herein.

The user device 102 is operable to be used by a user 112. As illustrated in FIG. 1A, in various examples, the user device 102 includes a processor 140 and a memory 150. The user device 102 may also include network and input/output (I/O) interfaces 142, a user interface 144, and storage 146. In various examples, the processor 140 of the user device 102 accesses the safety server 104 through wireless or wired communication. In various examples, the processor 140 executes a specific set of program instructions of a safety application stored in the memory 150 such that the user device 102 may display information, receive user input, receive image and/or video data, to receive and transmit data to the safety server 104, hero 106, or service providers 110 via the network 108, and otherwise enable the user 112 to interact with the user device 102 as described in greater detail below. If the user device 102 does not have such program instructions available, then the user 112 may install such program instructions.

In various examples, the user interface 144 is a screen or display that enables the user 112 to interact with the user device 102. The user interface 144 may include at least touch screens, device buttons, keypads, stylus, or other similar devices for inputting information and interacting with the user device 102. As described below with reference to FIG. 2, in various examples, the user interface 144 enables the user 112 to enter the user's identification, input contact information for a hero 114, select existing contact information for a hero 114, select various other third party contact information, select various selectable buttons or icons presented on the user interface 144, and perform various other interactions with the user device 102. As used herein, the hero 114 is a contact designated by the user 112 to receive the safety information described herein. The hero 114 may be family members, relatives, friends, designated drivers, employers, probation officers, campus security, or any other contact designated by the user 112 to receive the safety information.

Figure 20:
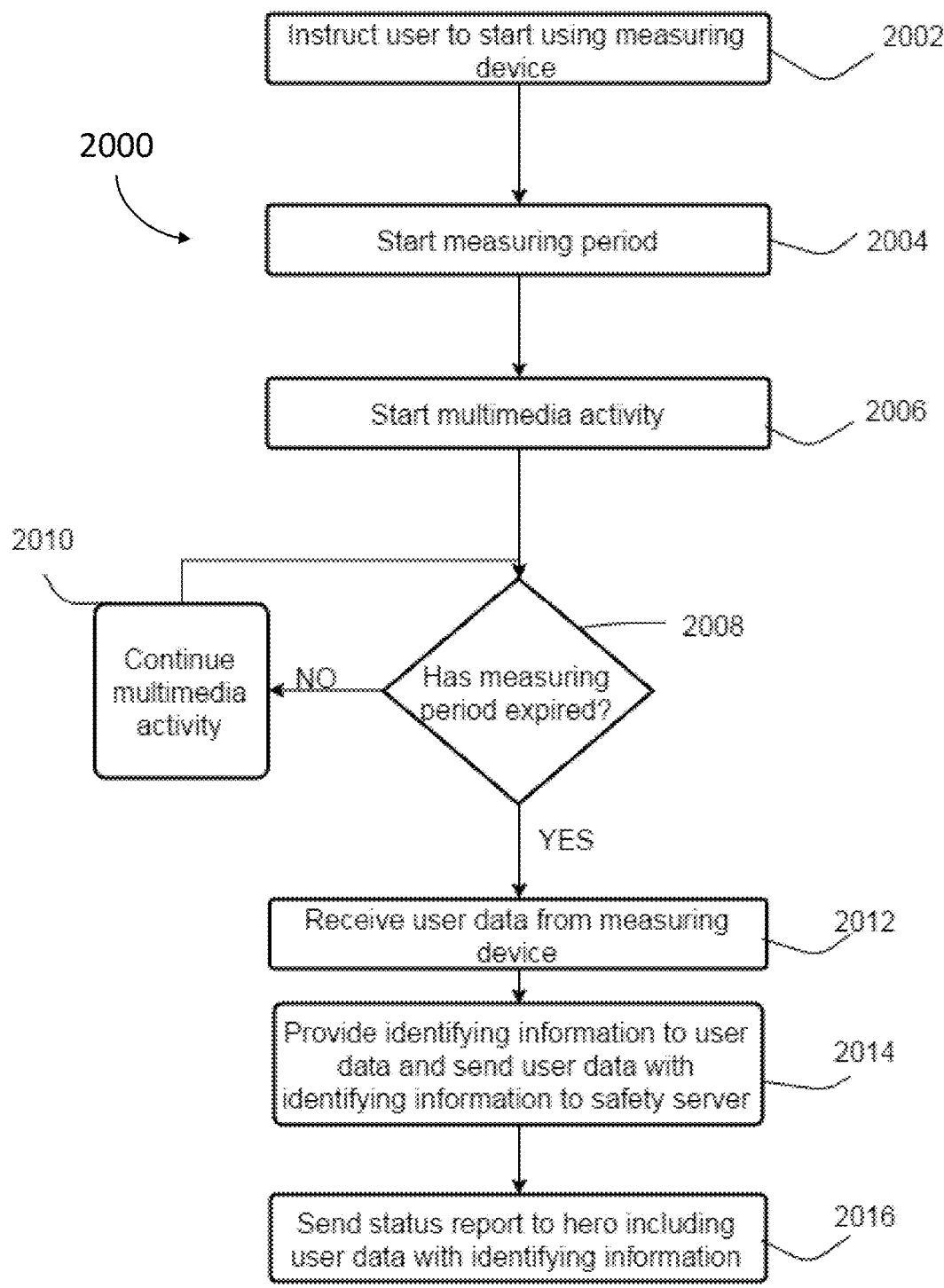
FIG. 20 illustrates an example of a method of for monitoring a safety condition of a user with a safety mobile application according to the present disclosure.
Figure 21:
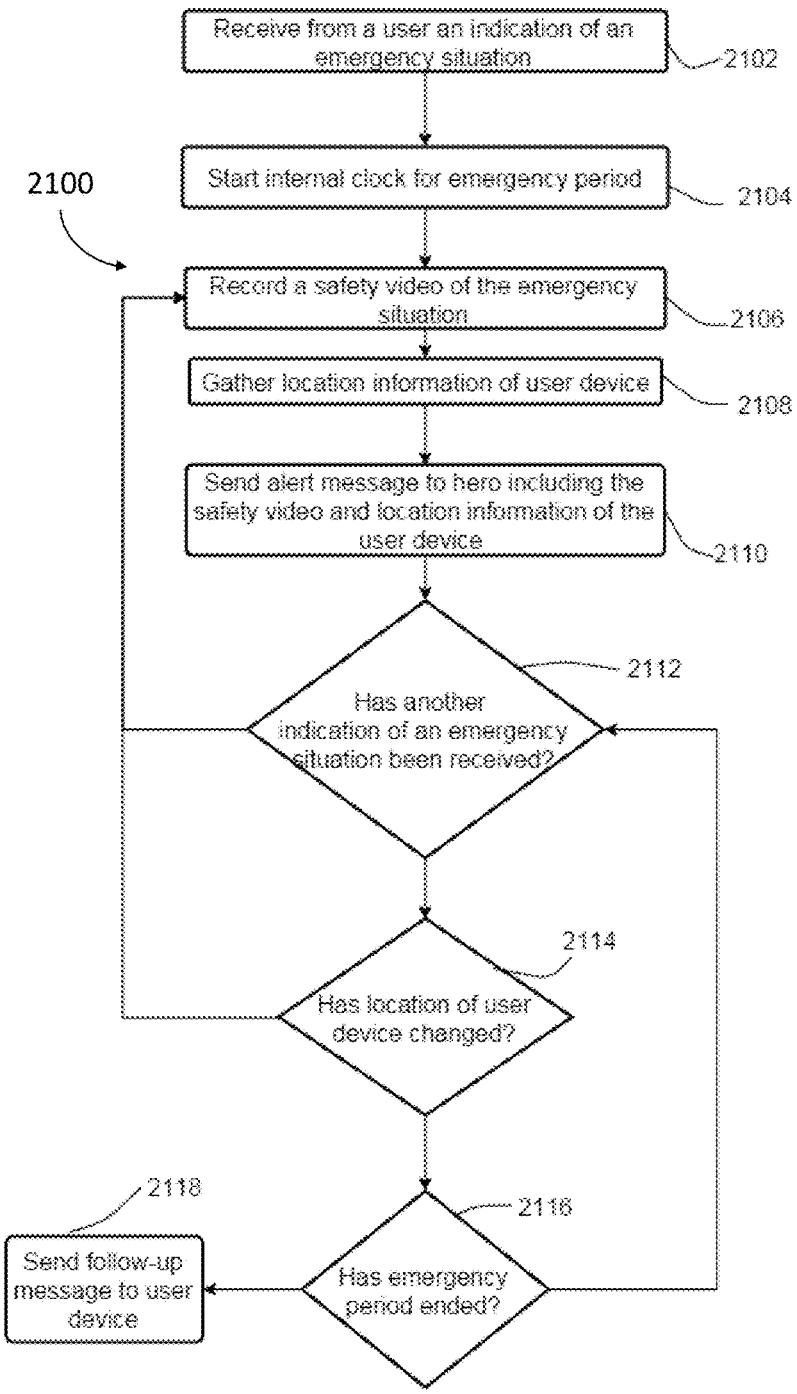
FIG. 21 illustrates another example of a method for monitoring a safety condition of a user with a safety mobile application according to the present disclosure.

In various examples, the memory 150 of the user device 102 is a computer-readable medium, such as a non-transitory computer-readable storage medium, that stores instructions executable by the processor. Thus, the memory 150 may be, for example, random access memory (RAM), electrically-erasable programmable read-only memory (EPPROM), a storage drive, an optical disk, and any other suitable type of volatile or non-volatile memory that stores instructions to cause a programmable processor (i.e., processing resource) to perform the techniques described herein. In examples, the memory 150 includes a main memory, such as a RAM in which the instructions may be stored during runtime, and a secondary memory, such as a nonvolatile memory in which a copy of the instructions is stored. The memory 150 is non-transitory in the sense that it does not encompass a transitory signal but instead is made up of one or more memory components configured to store the instructions described in greater detail below. The memory 150 may be representative of a memory resource and may store machine executable instructions, which are executable on a computing system such as the user device 102 in conjunction with processor 140. The memory 150 may also include one or more data structures for storing information. The computer executable program code or instructions in this scenario, may include one or more application programs, other program modules, program data, firmware, and/or an operating system 152. In various examples, the safety mobile application includes a BAC monitoring module 154 and an emergency module 156 stored in the memory 150. In various examples, the safety mobile application includes two modules: an emergency module 156 and a Blood Alcohol Content (BAC) monitoring module. An example of a routine or method performed by the BAC monitoring module 154 is illustrated in FIG. 20. An example of a routine or method performed by the emergency module 156 is illustrated in FIG. 21. In various examples, the hero 106 is similar to the user device 102 and includes a processor, memory, and user interface.

As illustrated in FIG. 1A, the system 100a includes the safety server 104. In various other examples, the system 100a may include a combination of different servers accomplishing the functions attributed to the safety server 104. In various examples, the safety server 104 includes one or more memories, one or more processors or controllers, and one or more data structures. The memory is a computer-readable medium that stores instructions to be performed by the safety server 104. The safety server 104 may be a centralized server of cluster of server computers that maintains the processes and data structures for a number of different users, or it may represent a distributed set of computers located in different geographic regions, each computer serving a different group of users, or it may be any other equivalent or combination thereof. The processor is used to access data from and store data in the data structures and to communicate with devices outside of the safety server 104. In various examples, the safety server 104 includes the data structures; however, in various other examples, the data structures is external to and accessible by the safety server 104, such as via the network 108 or other communication technique. In various examples, the data structures includes data corresponding to registered users. The data structures are created by entering in various types of data from a user 112 (or a number of various different users). This data may include user identification information such as name, address, telephone number, height, weight, gender, email address, Short Message Service (SMS)/Multimedia Messaging Service (MMS) address, and any other suitable information capable of identifying a specific registered user 112. The stored data may also include user history information, results history, video, pictures, notes, text, rules (e.g. blood alcohol content (BAC) levels, Panic levels, Parent based rules, etc.), health related data, and various other types of data corresponding to specific users.

In various examples, the user device 102 may access the data on the safety server 104. In various examples, the data is encrypted on the safety server 104 as a security feature of the system 100a. In various examples, additional security features such as password protection are utilized to secure and limit access to the data. Storage on the safety server 104 provides privacy by maintaining this data in accordance with payment-card industry (PCI), personally-identifiable information (PII), and/or other standards concerning data capture and privacy. In various examples, the user data may require user verification such as through password, fingerprint scan, photo verification, or various other types of user verification if the user 112 desires to remove a user data history created by the safety mobile application In various examples, other databases, including non-proprietary databases, of various service providers 110 may be utilized to provide information to the user device 102. In various examples, these databases include those databases associated with various social media platforms (e.g. Facebook®, LinkedIn®, Google+®, etc.). In various examples, the user device 102 may access various social media platforms via an Applications Programming Interface (API), a web-based interface, or various other equivalents or combinations thereof. The service providers 110 include a centralized server or cluster of server computers. The service providers include includes one or more memories, one or more processors or controllers, and one or more data structures. The memory is a computer-readable medium that stores instructions to be performed by the service providers 110. The processor is used to access data from and store data in the data structures and to communicate with devices outside of the service providers 110.

In various examples, the user device 102 is able to communicate with the various service providers 110 via the network 108. The service providers 110 may be able to provide any sort of service to its end users. For example, the service providers 110 may be a taxi service, a driver-for-hire service, a hotel or hotel-finder service, a designated driver service, a lawyer-referral service, a legal assistance service, a car-rental service, a health promotion service, a rehabilitation service, a health safety service, or various other types of services. In various examples, the user device 102 running the safety application may communicate with the service providers 110 via an API or web-based interface.

In various examples, the user device 102 is also in communication with a measuring device 120. In various examples, the measuring device 120 is a breathalyzer alcohol sensor; however, the disclosure of a breathalyzer as a measuring device 120 should not be considered limiting on the current disclosure. Other appropriate types of devices and/or sensors may be used in place of the breathalyzer, including, but not limited to, a heart rate monitor (e.g. those incorporated into wearable technology like Fitbit, Apple Watch, Android Watch, and various other similar devices), activity trackers, and various other measuring devices. In the examples where the measuring device 120 is a breathalyzer, the measuring device 120 contains the requisite components to detect and record a BAC of a breath of the user 112. The measuring device 120 then transmits the BAC data to the user device 102. In various examples, the measuring device 120 is in wired and/or wireless communication with the user device 102. In various examples, the measuring device 120 is in wireless communication with the user device 102 utilizing Bluetooth, wireless Ethernet, and/or near field communication technology. The number of measuring devices 120 should not be considered limiting on the current disclosure.

In various examples, the user device 102 is in communication with various other devices such as a car ignition interlock. In various examples, the user device 102 is in communication with the car ignition interlock via Bluetooth or using another suitable wired or wireless technology. The user device 102 running the safety mobile application may be able to prevent the user 112 from starting a car via the car ignition interlock if certain parameters are met, as described in greater detail below.

The number of servers, processors, memory, databases, and user interfaces should not be considered limiting on the current disclosure. Furthermore, the configuration illustrated in FIG. 1A for the user device 102, hero 106, and safety server 104 is for illustrative purposes only and should not be considered limiting on the current disclosure. In various examples, the safety mobile application described herein is compliant with certain mobile device operating systems (OSs), such as Apple's iOS, Google's Android, and various other operating systems.

Figure 1B:
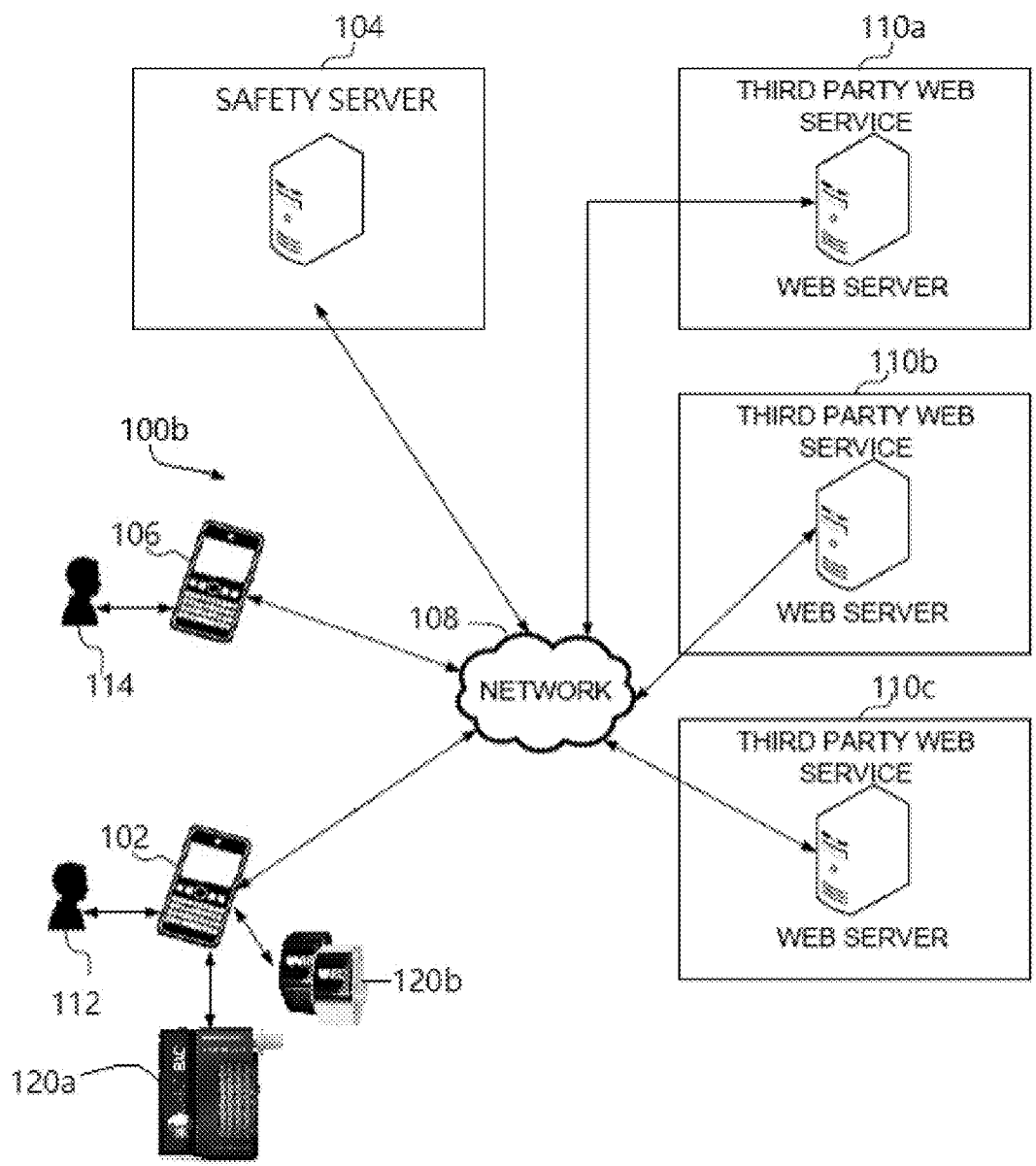
FIG. 1B illustrates another examples of a system employed for implementing a safety mobile application according to an example of the present disclosure.

FIG. 1B illustrates another example of a simplified communication system 100b for the receiving, storing, transmitting, and utilization of a safety condition of the user 112. Similar to the system 100a, the system 100b includes the user device 102, the safety server 104, the hero 106, and the service providers 110a,b,c. As illustrated in FIG. 1B, in various examples, the user device 102 is in communication with a first measuring device 120a and a second measuring device 120b. Each measuring device 120a,b may measure a different type of user data during a measuring period. For example, a first measuring device may measure a first type of user data during the measuring period and a second measuring device may measure a second type of user data during the measuring period. In various examples, the first measuring device 120a is a breathalyzer configured to measure the BAC of a user 112 and the second measuring device 120b is a heart rate monitor configured to measure a heart rate of the user 112. However, the number of measuring devices 120 and type of measuring devices 120 should not be considered limiting on the current disclosure as in various other examples, any desired number of measuring devices 120 may be utilized.

Figure 3:
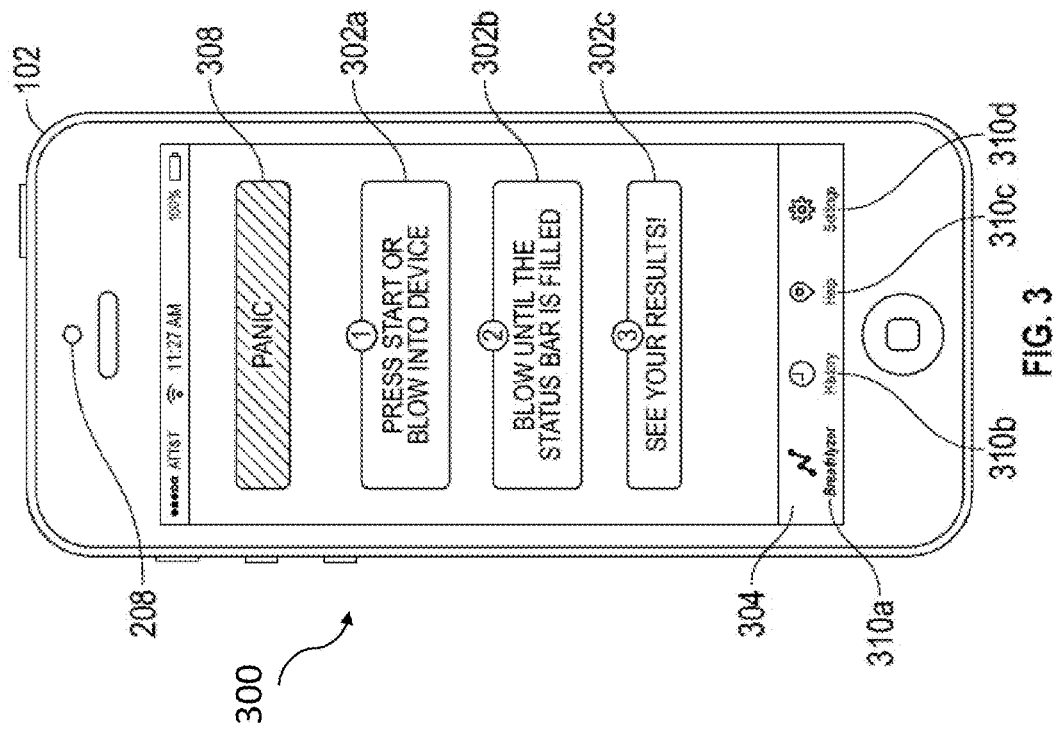
Figure 2:
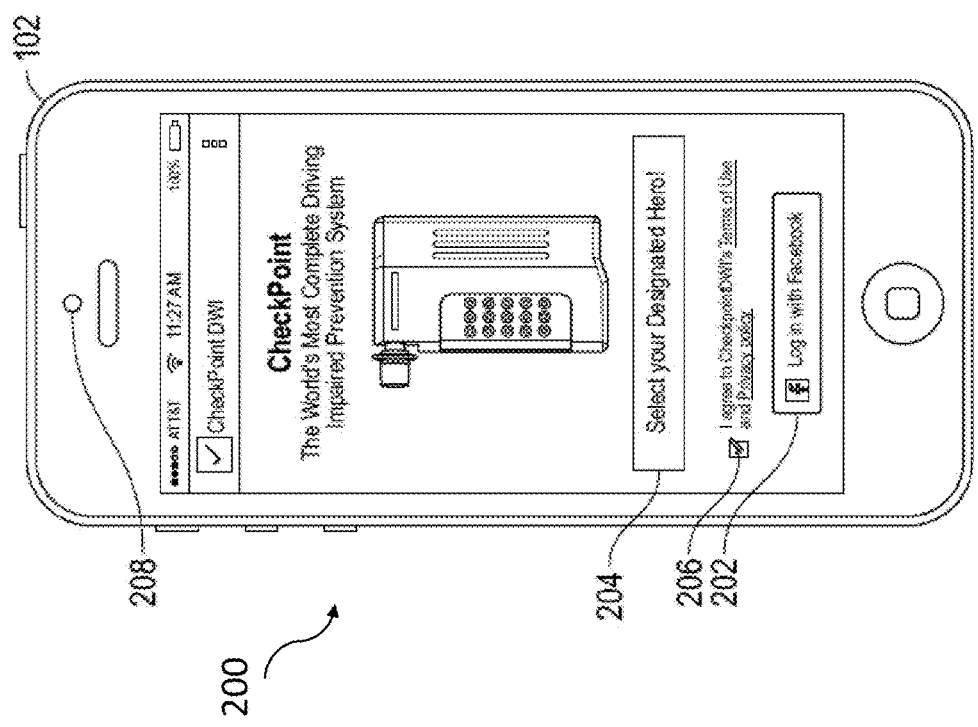

FIGS. 2 and 3 illustrate examples of user interfaces 200,300 on the user device 102 operated by the user 112. It should be noted that the labels and placement of interface elements are representative only and that the importance is on their underlying functions. Likewise, it should be understood that any buttons can be physically moveable switches, softkeys, proximity switches, voice detectors, motion sensor, etc. operable to perform a function in response to user's 112 desires.

In FIG. 2, the user 112 may engage with a login element 202 after launching the safety mobile application on the user device 102 for the first time. The safety mobile application may utilize the login element 202 to provide access control to the safety mobile application in various examples. In various examples, the user 112 may login using social media account credentials such as a social media username and password with Facebook®, LinkedIn®, Google+®, or various other similar accounts. In various examples, the safety mobile application may also provide options to the user 112 to create an account. The user 112 may create an account by providing personal credentials and a password from scratch or log in to another existing account not associated with a social media platform. If a user 112 logs in with social media or another account, the safety mobile application may import the user's 112 name, email, or other identifying personal credentials.

The user-entered username and password are transmitted to the safety server 104 to create a new user account or to authenticate against an existing user account. In various examples, after the user 112 has been authenticated, the user 112 may remain logged in such that subsequent launches of the safety mobile application may not require the user 112 to reenter the user's 112 username and password. In various other examples, the user 112 may be logged out of the safety mobile application after exiting the safety mobile application.

FIG. 2 illustrates the user interface 200 in accordance with aspects of the present disclosure. In particular, the user interface 200 may be used by the user 112 to engage with the hero designation element 204. Engagement with the hero designation element 204 causes a hero 114 to be designated by the user 112. The selection of the hero 114 via the hero designation element 204 is transmitted to and stored by the safety server 104. As previously described, a hero 114 is a contact designated by the user 112 to receive the safety information described herein. In various examples, the hero 114 is selectable from a list of contacts with contact information stored in the memory of the user device 102. In various examples, the hero 114 and associated contact information may be entered by the user 112. The contact information may include information from the group including, but not limited to, name, address, telephone number, social media address, SMS/MMS number, email address, or any other contact information.

As illustrated in FIG. 2, in various examples, the user 112 may also engage an agreement element 206. The agreement element 206 may include the safety mobile application's Terms of Use and Privacy Policy in various examples. The Terms of Use may clarify that the safety mobile application is an application for reference purposes only and does not actually prevent dangerous situations from occurring. For example, in various examples, the Terms of Use clarify that the safety mobile application does not actually prevent dangerous situations such as impaired driving or domestic violence. For example, in various examples, the Terms of Use may further clarify that the user 112 is agreeing to use the safety mobile application at his or her own risk. In various examples, the Privacy Policy may indicate how data collected by the mobile application will be used, where the data will be stored, and who owns the data in various examples. For example, in various examples, any data collected by the safety mobile application is stored on the safety server 104. This data may be fully encrypted in various examples. In various examples, the user 112 owns the data stored on the safety server 104 and has the right to determine whom they share the data with in various examples. In various examples, the data stored on the safety server 104 is further password protected to further secure and limit access to the stored data on the safety server 104.

FIG. 3 illustrates the user interface 300 in accordance with aspects of the present disclosure. In particular, the user interface 300 may be used by the user 112 upon successful log in to the safety mobile application and/or successful launch of the safety mobile application. In various examples, after the user 112 has logged in to the safety mobile application, the safety mobile application is configured to time and date stamp the beginning and end of the various activities performed by the user 112 described herein. The safety mobile application may also be configured to provide location information for the various activities performed by the user 112. As previously described, this data is transmitted to the safety server 104 for secure storage.

As illustrated in FIG. 3, the user 112 may engage with a panic element 308, which will be described in greater detail below. Engagement with the panic element 308 activates the emergency module 156, which is described in greater detail below.

As illustrated in FIG. 3, the user 112 may also engage a selectable button or selectable icon 310 presented to the user 112 on a dashboard 304. In various examples, the dashboard 304 allows the user 112 on the user device 102 to see and access data stored on the safety server 104. In the present example, the dashboard 304 includes four selectable icons 310a,b,c,d; however, in various other examples, the dashboard 304 may include any desired number of selectable icons 310. The selectable icons 310 may be associated with various user data stored on the safety server 104 such as historical BAC levels, previous incidents, services used, heroes alerted and hero responses, current alerts, prior alerts, and various other data gathered by the safety mobile application such that the user 112 is presented with particular user data upon selection of a selectable icon 310. The selectable icons 310 may also be associated with various features of the safety mobile application such as a help feature, a settings feature, a pairing feature on the measuring device 120, and various other similar features that may be utilized by the user 112.

In various examples, the user 112 may also engage the dashboard 304 to define what alerts are monitored and sent by the safety mobile application to approved heros 106 from the user device 102 via the safety server 104. In various examples, the user 112 may define what alerts are monitored and sent by engaging a "Settings" selectable icon 310. In various examples, an approved source may also define rules and alerts for the safety mobile application. The approved source may be selected from the group including, but not limited to, parent, legal guardian, employer, friend, relative, government source, or any other source approved by the user 112 and/or provided access credentials based on the source meeting certain approval criteria. In various examples, these defined rules may include those from the group including, but not limited to, BAC levels, emergency panic levels, parent-based rules, employer-based rules, and any other similar rules defining various thresholds at which alerts are monitored and sent by the user device 102 via the safety server 104. In various examples, these rules are stored on the safety server 104.

As illustrated in FIG. 3, the safety mobile application displays on the home screen interface instructions or steps 302 the user 112 may take to activate the BAC monitoring module 154. In the present example, the safety mobile application presents three steps 302a,b,c to the user 112 on the home screen interface; however, the number of steps 302 should not be considered limiting on the current disclosure. In various examples, the steps 302 may include instructions such as how to turn on the monitoring device, how to begin testing, how long to use the monitoring device, how to view the results, and various other instructions.

FIGS. 4-11 illustrate examples of user interfaces 400,500, 600,700,800,900,1000,1100 on the user device 102 operated by the user 112 upon activation of the BAC monitoring module 154 from the home screen interface illustrated in FIG. 3. In various examples, the BAC monitoring module 154 registers and records the user's 112 BAC levels as stored data. The BAC monitoring module 154 includes associated disclaimers on accuracy of data which the user 112 agrees to in FIG. 2.

Similar to FIGS. 2 and 3, the labels and placement of interface elements are representative only and that the importance is on their underlying functions. Likewise, it should be understood that any buttons can be physically moveable switches, softkeys, proximity switches, voice detectors, motion sensor, etc. operable to perform a function in response to user's 112 desires.

In various examples, the BAC monitoring module 154 is activated by the user 112 activating the measuring device 120 such that the measuring device 120 is in wireless communication with the user device 102. In various examples, the measuring device 120 is a breathalyzer device which connects to the user device 102 via Bluetooth or using another suitable wired or wireless technology. In various examples, the measuring device 120 includes a status indicator, such as a status bar, display, or various other indicators, such that the user 112 using the measuring device 120 is notified when a measuring of user data is completed. In various other examples, the status indicator may also be displayed on a user interface of the user device 102.

After the measuring device 120 is turned on and connected to the user device 102, the safety mobile application starts a timer for the measuring period. The measuring period corresponds with the amount of time that is needed by the measuring device 120 to collect the user data from the user 112. In various examples, the measuring period is a predetermined period of time. In various examples, the measuring period may be between zero and fifteen seconds, such as about three to seven seconds, such as about three to five seconds. In various other examples, the measuring period may be any suitable time period corresponding with the amount of time needed by the measuring device 120 to collect user data. For example, in various other examples, the measuring period may be less than three seconds, greater than 15 seconds, or any other suitable time interval. As illustrated in FIG. 4, upon initiation of the measuring period, the BAC monitoring module 154 activates a camera 208 of the user device 102 and records a video 402 of the user 112 using the measuring device 120 via the camera 208. In various examples, the measuring period is one of a plurality of measuring periods.

In various examples, the BAC monitoring module 154 may prompt the user 112 to utilize the measuring device 120 to begin the measuring period. For example, when the measuring device 120 is the breathalyzer device, the BAC monitoring module 154 may prompt the user 112 to blow into the breathalyzer device and begin the measuring period. In various examples, the measuring device 120 may transmit the user data to the user device 102 during the measuring period or after the conclusion of the measuring period.

FIG. 4 illustrates the user interface 400. As illustrated in FIG. 4 and as previously described, in various examples, the BAC monitoring module 154 records a video 402 of the user 112 while the user 112 is using the measuring device 120 for the duration of the measuring period. In various examples, the BAC monitoring module 154 further takes a picture of the user 112 using the measuring device 120 via the camera 208. In various examples, the BAC monitoring module 154 may take a series of pictures at predetermined time intervals during the measuring period. In various examples, the duration of the video 402 is about the same as the duration of the measuring period; however, in various other examples, the duration of the video 402 may be less than the duration of the measuring period. For example, the duration of the video 402 may be between zero and fifteen seconds, such as about three to seven seconds, such as about three to five seconds. In various other examples, the duration of the video 402 may be less than about three seconds or greater than about fifteen seconds. As illustrated in FIG. 4, the user 112 may engage a cancel element 404. Engagement with the cancel element 404 may cause the safety mobile application to stop the measuring period, stop recording the video 402, and exit the BAC monitoring module 154.

A common problem with user devices 102 such as portable computers, mobile phones, wearable computers, laptops, smart phones, tablets, and other similar mobile devices is that these devices are resource-constrained inherent in the mobile device design. The resource-constrained nature of mobile devices makes it difficult for the mobile devices to support computation-intensive applications while maintaining quality. In many circumstances, running one or more computation-intensive applications on a mobile device causes a reduction in functionality and disrupts or slows down the speed and effectiveness at which the application or applications run. Video processing by the user device 102 and wireless control of and communication with the measuring device 120 by the user device 102, as supported by the safety mobile application, are both computation-intensive and resource-intensive processes for the user device 102 to run. By limiting the duration of the video 402 to a relatively short time frame, the safety mobile application ensures that the user device 102 is able to support both the video processing and safety device communication without compromising the functionality or speed at which either process operates.

The video-recording feature of the safety mobile application in the BAC monitoring module 154 also keeps a user 112 from switching users or forging results during the measuring period of the BAC monitoring module 154 because the BAC monitoring module 154 time and date stamps the video 402, as described in greater detail below, which is sent to the hero 114 with the corresponding result from the measuring period (illustrated in FIG. 7). Once the measuring period is completed, the BAC monitoring module 154 may also time and date stamp the video 402 and/or picture and transmit this data from the user device 102 to the safety server 104. The BAC monitoring module 154 further time and date stamps the testing results for the user 112 for the measuring period and transmits this data from the user device 102 to the safety server 104. In various examples, the BAC monitoring module 154 may further store location information for the user data indicating the location of the user 112 when the user data was obtained. The BAC monitoring module 154 may determine whether the testing results violate or meet any rules previously defined by the user 112 and stored on the safety server 104 as described above. In various examples, if a rule is violated or met, the BAC monitoring module 154 automatically sends a message to the hero 114 or other contact, as described below.

FIG. 5 illustrates the user interface 500 on the user device 102 provided by the BAC monitoring module 154 upon completion by the user 112 of the measuring period. As illustrated in FIG. 5, the BAC monitoring module 154 displays a testing result element 502 presenting the testing results 604 for the user 112 from the measuring period. In various examples, the BAC monitoring module 154 may compare the testing results 604 to the predefined rules for any user data. In various examples, if the testing results 604 violate a predefined rule, the BAC monitoring module 154 may display the testing results 604 in a first color in the testing result element 502, and if the testing results 604 do not violate the predefined rule, the BAC monitoring module 154 may display the testing results 604 in a second color in the testing result element 502.

As illustrated in FIG. 5, the user 112 may engage with a hero request element 504, which is described in greater detail below. The user 112 may also engage with a dashboard 506, which may be functionally similar to the dashboard 304, and include selectable icons 508a,b,c,d or buttons, which may be functionally similar to the selectable icons 310. As illustrated in FIG. 5, in various examples, the user 112 may further engage with service provider elements 510a,b,c, which correspond with the service providers 110a, b,c, respectively, and may be selected to access various information or services provided by the service providers 110a,b,c as described in greater detail below. In various examples, the information or services provided by the service providers 110a,b,c may also be accessed through one of the selectable icons 310 on the dashboard 304 or one of the selectable icons 508 on the dashboard 506.

The hero request element 504 is selectable to enable the user 112 to communicate data to the preselected hero 114 or various other contacts if the user 112 desires to have assistance from the hero 114. In various examples, the hero request element 504 is an optional selectable feature for the user 112 to select on the user device 102 after the measuring period of the BAC monitoring module 154 is completed. In various examples, the hero request element 504, as an optional selectable feature, allows the user 112 to determine when to communicate that assistance is needed by the user 112 to the hero 106. In various examples, the hero 106 may be the hero's device or another contact's device.

In various examples, the safety mobile application automatically communicates a status report message 602 to a preselected hero 114 after the measuring period is completed. As described above, in various examples, the safety server 104 determines whether the testing results 604 violate or meet any rules defined for the user 112. If a rule is met or violated, depending on the rule, the safety server 104 may communicate this violation or compliance to the user device 102, causing the safety mobile application to automatically send the message to the hero's hero 106 from the user device 102. By way of example, in various examples where the measuring device 120 is a breathalyzer device, the application may automatically send a message to a contact if the safety server 104 determines the user's BAC is above the legal driving limit.

Figure 6:
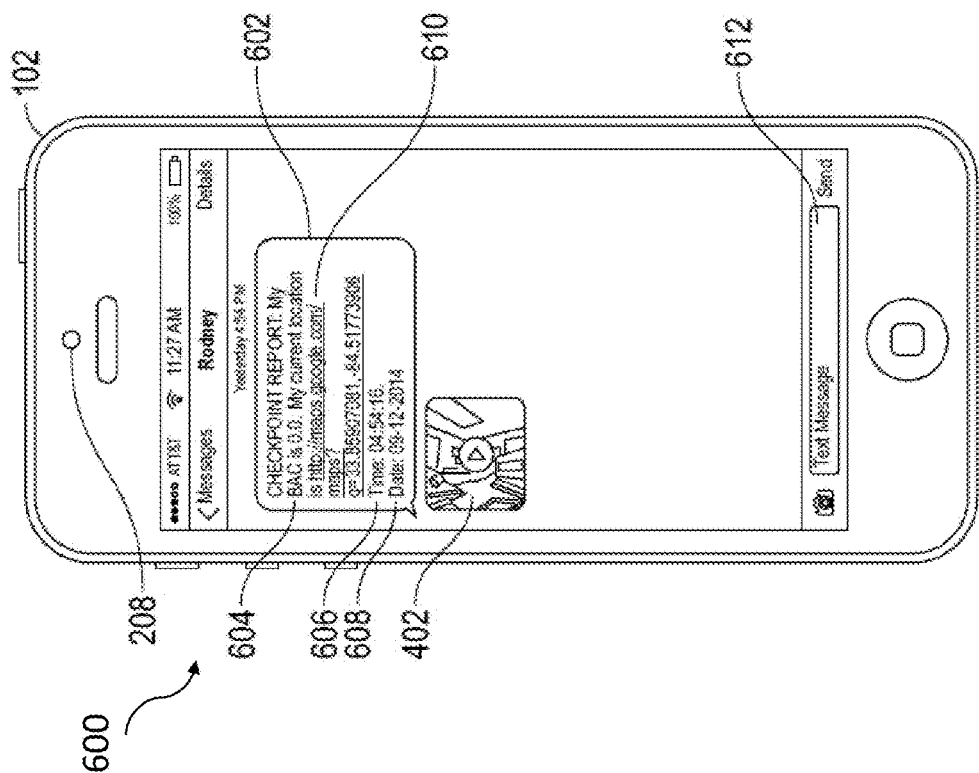

FIG. 6 illustrates one example of the status report message 602 automatically sent by the safety mobile application from the user device 102 to a hero 106 after the termination of the measuring period on the user interface 600. In various examples, the content of the status report message 602 is automatically generated by the BAC monitoring module 154; however, in various other examples, the content of the status report message 602 is customizable by the user 112. As illustrated in FIG. 6, in various examples, the content of the status report message 602 includes the testing results 604 of the user 112 from the measuring period. In various examples, the status report message 602 also includes identifying information to identify the testing results 604 as a particular testing result. The identifying information may include a time stamp 606 and a date stamp 608. The identifying information may also include location information 610 of the user device 102. In various examples, the BAC monitoring module 154 obtains the location information 610 of the user device 102 through a form of GPS (Global Positioning System) functionality on the user device 102. As illustrated in FIG. 6, in various examples, the message includes the location information 610 of the user device 102. In various examples, the location information 610 can be coordinates of the user device 102. In various examples, the location information 610 includes a link to a mapping or location based service or application such as Google Maps, Bing Maps, MapQuest, and other similar mapping applications which can display the GPS coordinates and location of the user device 102 on a map. The hero 114 may use the location information 610 to go to the location of the user device 102 if desired by the hero 114.

As described previously, the BAC monitoring module 154 may mark or otherwise store the identifying information with the testing results 604 and the video 402 after the conclusion of the measuring period. In various other examples, the BAC monitoring module 154 may include various other identifying information in addition to or in place of any of the time stamp 606, date stamp 608, or location information 610 that may be used to identify the testing results 604 as a particular testing result. The identifying information, such as the time stamp 606 and date stamp 608, is utilized by the safety mobile application to create a user history is various examples. The user history may be stored on the safety server 104 in various examples.

As illustrated in FIG. 6, in various examples, the status report message 602 may further include the video 402 of the user 112 using the measuring device 120 during the measuring period. The video 402 included in the status report message 602 is provided as verification for the hero 114 on the hero 106 that the testing results 604 in the status report message 602 are the results of the specific user 112. In this manner, the video 402 prevents a user 112 from switching users or forging results during the BAC monitoring module 154 because the safety mobile application matches the time and date stamped video 402 with the corresponding time and date stamped testing results 604 and sends the video 402 and testing results 604 in the status report message 602. The video 402 included as part of the status report message 602 may be utilized to verify that the testing results 604 were obtained from the user 112 and not from another person As illustrated in FIG. 6, the BAC monitoring module 154 may further provide customizable texting functionality 612 that the user 112 may engage to create a customized message to the hero 114 in addition to the testing results 604 and identifying information for the testing results 604.

In various examples, the BAC monitoring module 154 may communicate the testing results 604 for the user 112 from the measuring period and an indication of whether the testing results 604 are below or above a predetermined threshold to a third party safety device such as a car ignition interlock device. In various examples where the hero 106 is included, the user device 102 may be in wireless communication with the hero 106. In various examples, the rules or predefined user data threshold may be provided by the operator or provider of the hero 106. For example, when the third party safety device is the car ignition interlock, the provider of the car ignition interlock or the entity using the car ignition interlock may predefine various user data thresholds. In these examples, the BAC monitoring module 154 may compare the user data to the user data thresholds and compare the results to the third party safety device. For example, when the third party safety device is the car ignition interlock and the measuring device 120 is a breathalyzer, the BAC monitoring module 154 may compare the user data with the threshold at which the car ignition interlock will prevent a car's engine from being started. Depending on the result of the comparison, the BAC monitoring module 154 may communicate with the car ignition interlock that the user data is below the threshold, thereby enabling the car engine to start, or that the user data is above the threshold, thereby preventing the car engine from starting.

Figure 7:
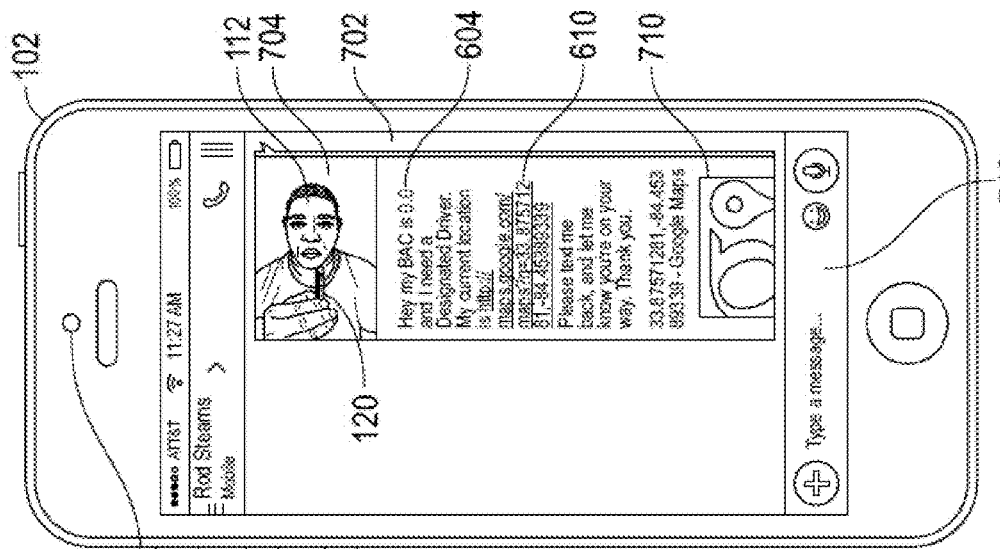

FIG. 7 illustrates an example of a hero request message 702 created by the hero request element 504 of the safety mobile application via the user interface 700. Similar to the status report message 602, in various examples, at least a portion of the content of the hero request message 702 may be automatically generated by the safety mobile application In various examples as illustrated in FIG. 7, the content of the hero request message 702 automatically generated by the safety mobile application may include the testing results 604 and a request by the user 112 for assistance from the hero 114. The hero request message 702 may include the location information 610 of the user device 102. The automatically generated content of the hero request message 702 may also include a location link 710 to a mapping or location based service or application which can display the GPS coordinates and location of the user device 102 on a map.

As illustrated in FIG. 7, the automatically generated content of the hero request message 702 also includes a picture 704 of the user 112 using the measuring device 120 in various examples. Similar to how the BAC monitoring module 154 utilized the camera 208 to record a video 402 of the user 112 during the measuring period, in various examples, the BAC monitoring module 154 may utilized the camera 208 to take a picture 704 of the user 112 during the measuring period. The BAC monitoring module 154 may then store the picture 704 with identifying information, such as a time stamp 606 and a date stamp 608, on the safety server 104. When the hero request message 702 is generated by the safety mobile application, the safety mobile application matches the time and date stamped picture 704 with the corresponding testing results 604 and sends the picture 704 and testing results 604 in the hero request message 702. As illustrated in FIG. 7, the safety mobile application may further provide customizable texting functionality 712, which is similar to the texting functionality 612, that the user 112 may engage to create a customized message to the hero 114 in addition to the testing results 604 and identifying information for the testing results 604. In various other examples, the hero request message 702 may include the video 402.

Referring back to FIG. 5, in various examples, the service provider element 510a is a taxi service element, service provider element 510b is a hotel service element, and service provider element 510c is a driver-for-hire provider element. In general, selection of any of the service provider elements 510 enables the user 112 to view and select various resources to alert or receive services from. In various examples, these resources may include those from the group including, but not limited to, counseling, food, lodging, transportation, employer, government services, aid, or any other resources the user 112 may want to alert or receive services from. In various examples, the list of resources presented upon the selection of each service provider element 510a,b,c is preselected by the user 112 as approved trusted resources. These approved selected resources may be stored on the safety server 104 and associated with that particular user 112. In various examples, the list of resources presented upon the selection of each service provider element 510a,b,c is based on location based services within a geographic region associated with the user device 102. In these examples, the GPS functionality of the user device 102 may be used to locate the user device 102 such that the safety mobile application may determine nearby resources via the service provider elements 510a,b,c. In various examples, the services of the service providers as displayed on the user device 102 as service provider elements 510a,b,c may be sorted or prioritized by the safety mobile application based on affiliations, promotions, sponsorships, discounts, services, or various other categorical criteria.

In various examples, after the user 112 selects one of the listed resources or services provided by one of the service providers, the safety mobile application may put the user 112 in communication with the resource via the user device 102, provide contact information for the resource for the user 112 to selectably communicate with the resource via the user device 102, or provide walking directions for the user 112 to the resource. In various other examples, the safety mobile application may provide various other information corresponding to the resource selected by the user 112.

FIGS. 8 and 9 illustrate user interfaces 800,900 upon the selection by the user 112 of a hotel service element, such as the service provider element 510b. As illustrated in FIGS. 8 and 9, in various examples, the service provider elements 510a,c may be presented for the user 112 to select as desired. In various examples, the user interface further provides additional service provider elements 510 for the user 112 to select, such as service provider element 510d. In present example, the service provider element 510d is a legal services element; however, the type of service provider element should not be considered limiting on the current disclosure. The number of service provider elements 510 should not be considered limiting on the current disclosure.

As illustrated, the user interface includes a listing of service resources, such as a listing of hotels 802a-j with distances 804a-j and direction elements 806a-j to each hotel 802a-j, respectively. In various examples, the direction elements 806a-j are selectable links such that selection of a direction element 806, such as direction element 806a, provides the user 112 with the user interface 1000 having a map 1002 via a mapping or location based service or application, as illustrated in FIG. 10, which can display the GPS coordinates and location of the user device 1006 and the GPS coordinates and location of the hotel 802a corresponding with the direction element 806a selected, along with directions 1004 from the user device 1006 to the hotel 802a.

FIG. 11 illustrates the user interface 1100 on the user device 102 upon the selection by the user 112 of the service provider element 510d. Similar to the user interface illustrated in FIGS. 8 and 9, the user interface illustrated in FIG. 11 includes a list of service resources. In the present example, the listing of service resources includes a listing of legal services 1102a-e and communication elements 1104a-e for each legal service 1102a-e, respectively.

FIGS. 12-16 illustrate one example of a sequence of user interfaces 1200,1300,1400,1500,1600 on the user device 102 operated by the user 112 upon activation of the emergency module 156 from the home screen interface illustrated in FIG. 3. Similar to FIGS. 2 and 3, the labels and placement of interface elements are representative only and that the importance is on their underlying functions. Likewise, it should be understood that any buttons can be physically moveable switches, softkeys, proximity switches, voice detectors, motion sensor, etc. operable to perform a function in response to user's 112 desires.

In various examples, the emergency module 156 is activated upon selection of the panic element 308 by the user 112. After the emergency module 156 is activated, the emergency module 156 may present or display a confirmation indication or message 1202 on the user interface. In various examples, the confirmation message 1202 provides confirmation that that emergency module 156 has been activated and that the hero 114 has been contacted. The confirmation message 1202 provides a confirmation of a receipt of the indication of the emergency situation from the user 112.

Figure 13:
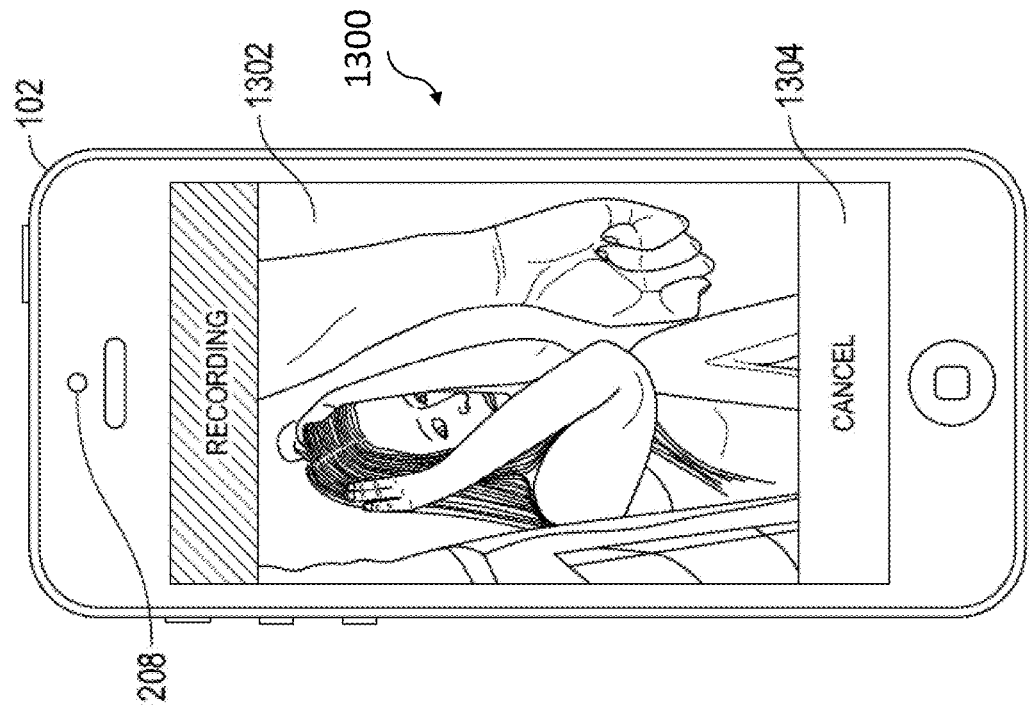
Figure 12:
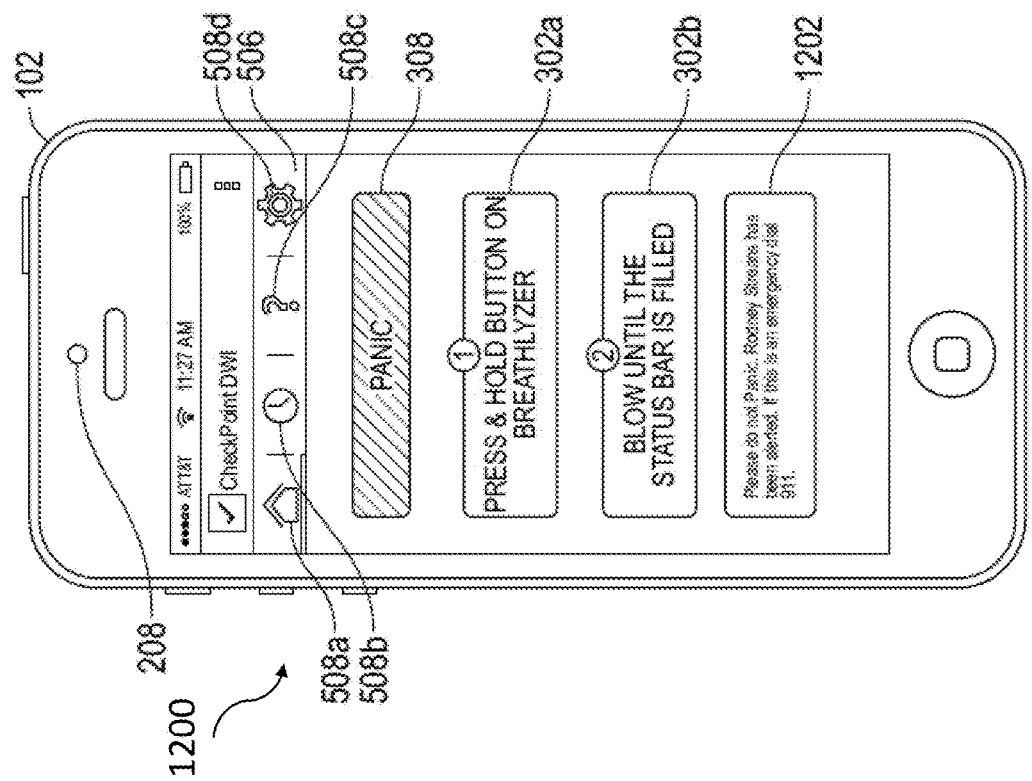

In various examples, upon activation of the emergency module 156, the emergency module 156 starts a timer for an emergency period. The emergency module 156 may automatically begin video and audio recording of the situation as viewed through the camera 208 and as heard through a microphone (not illustrated) of the user device 102. FIG. 13 illustrates one example of a safety video 1302 being recorded automatically upon selection of the panic element 308. Safety video 1302 may be similar to video 402 and have a relatively short duration. For example, in various examples, the safety video 1302 may be recorded by the emergency module 156 via the camera 208 for a duration between zero and fifteen seconds, such as about three to seven seconds, such as about three to five seconds. In various other examples, the video and audio recording period may be any suitable time period. In various examples, the audio and video recording records a situation in progress or after the event has occurred to validate the situation underway and capture as many facts and data available. As with other data collected by the safety mobile application, the emergency module 156 marks the data captured in the safety video 1302 and audio recording with identifying information as described above, such as time and date information, and transmits the data to the safety server 104 from the user device 102 for secure storage. In various examples, the data is secured on the safety server 104 through various security protocols including, but not limited to, passcodes, facial recognition, fingerprint scans, and various other security protocols for securely storing the data on the safety server 104. In various examples, storage of data on the safety server 104 prevents the data from being destroyed even if removed from the user device 102. As illustrated in FIG. 13, the user 112 may engage a cancel element 1304, which may be functionally similar to cancel element 404. Engagement with the cancel element 1304 may cause the safety mobile application to exit the emergency module 156. In addition to automatically starting video and audio recording, after the panic element 308 is selected, the emergency module 156 sends an automatic message to at least one contact, such as the hero 114.

One example of an automatic alert message 1402 sent to at least one contact is illustrated in FIG. 14. In various examples, the alert message 1402 includes an alert notification 1404 indicating that the user 112 has selected the panic element 308. The alert message 1402 may also provide location information 610 of the user device 102. In various examples, the content of the alert message 1402 is automatically generated by the emergency module 156. In various examples, multiple alert notifications 1404 are included in the alert message 1402. In various examples, new alert notifications 1404 are sent as the location information 610 of the user device 102 changes. As illustrated in FIG. 14, the emergency module 156 may further provide customizable texting functionality 1406 that the user 112 may engage to create a customized message to the hero 114. The texting functionality 1406 is similar to the texting functionalities 612,712, respectively.

FIG. 15 illustrates another example of an alert message 1502 created by the emergency module 156 upon selection of the panic element 308. In various examples, the content of the alert message 1502 is automatically generated by the emergency module 156. As illustrated in FIG. 15, in various examples, the alert message 1502 is similar to alert message 1402 and includes an alert notification 1404. In various examples, multiple alert notifications 1404 are included in the alert message 1502. As illustrated in FIG. 15, in various examples, the alert message 1502 also includes location information 610 of the user device 102. In various examples, new alert notifications 1404 are created and new location information 610 is included in the alert message 1502 as the location information 610 of the user device 102 changes. As illustrated in FIG. 15, in various examples, the alert message 1502 also includes the safety video 1302 recorded by the emergency module 156. As illustrated in FIG. 15, in various examples, multiple safety videos 1302 may be included in the alert message 1502. In various examples, a new safety video 1302 is included in the alert message 1502 when the panic element 308 is pressed.

Figure 16:
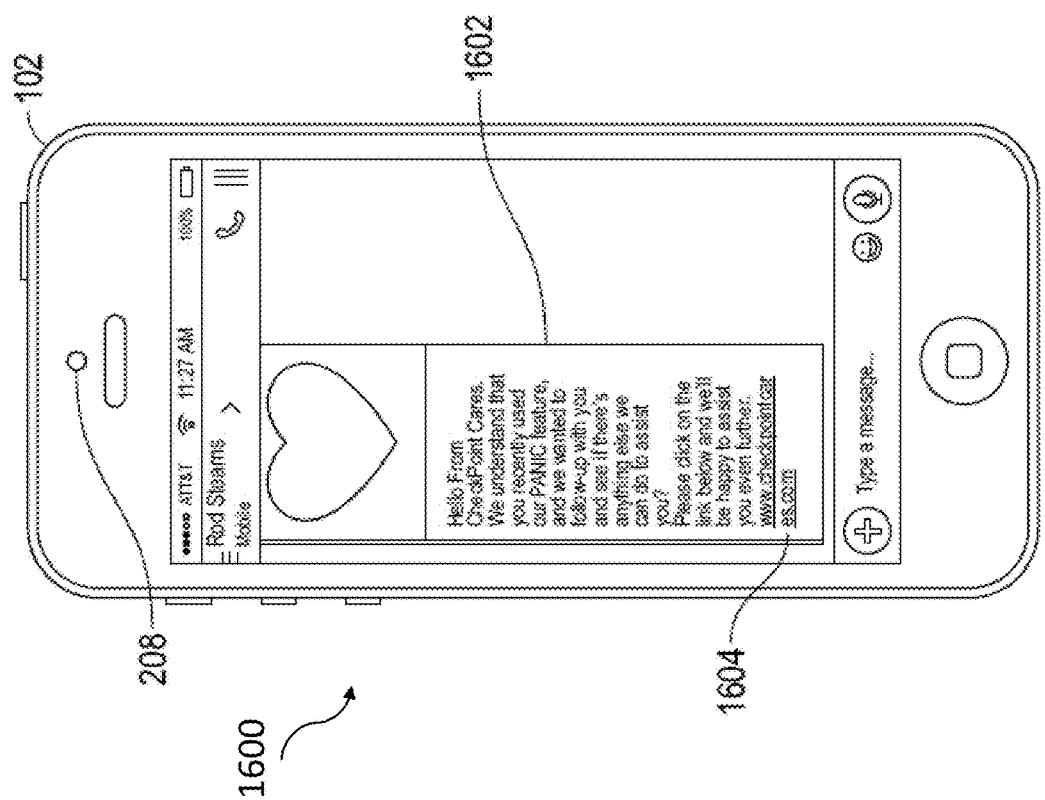

As previously described, in various examples, the emergency module 156 starts the timer for the emergency period after the panic element 308 is selected by the user 112. In various examples, after the emergency period has expired, the safety server 104 communicates a follow-up message 1602 to the user device 102 as illustrated in FIG. 16. The follow-up message 1602 may confirm that the emergency module 156 was activated. The follow-up message 1602 may also prompt the user 112 to indicate if the emergency situation was addressed in various examples. In various examples, the follow-up message 1602 may provide the user 112 with a link 1604 to additional resources to address the emergency situation. In various examples, the emergency period is about 24 hours after the panic element 308 was selected. In various examples, the emergency module 156 may determine whether additional follow-up with the user 112 is needed based on the response to the follow-up message 1602.

Figure 18:
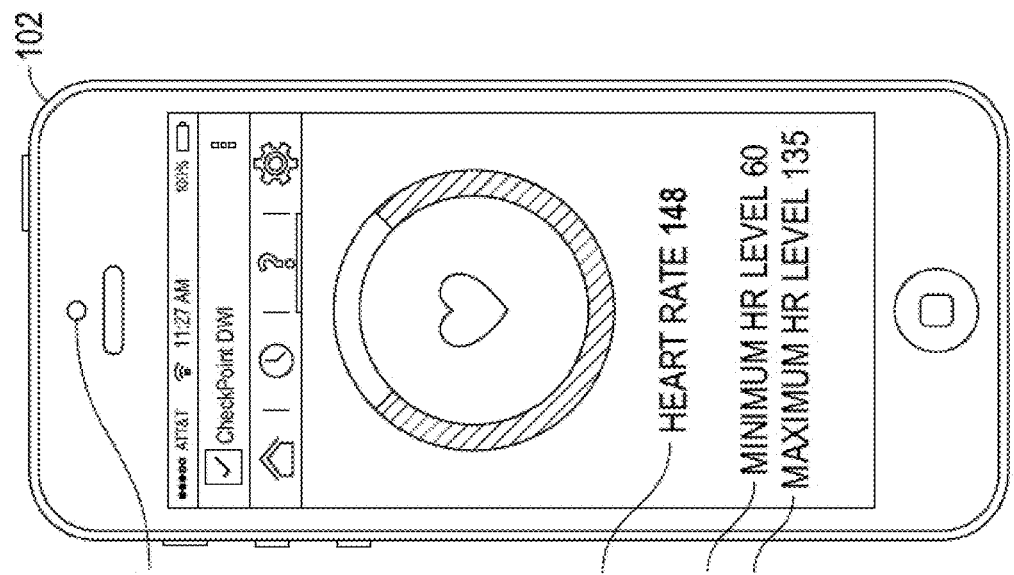
Figure 17:
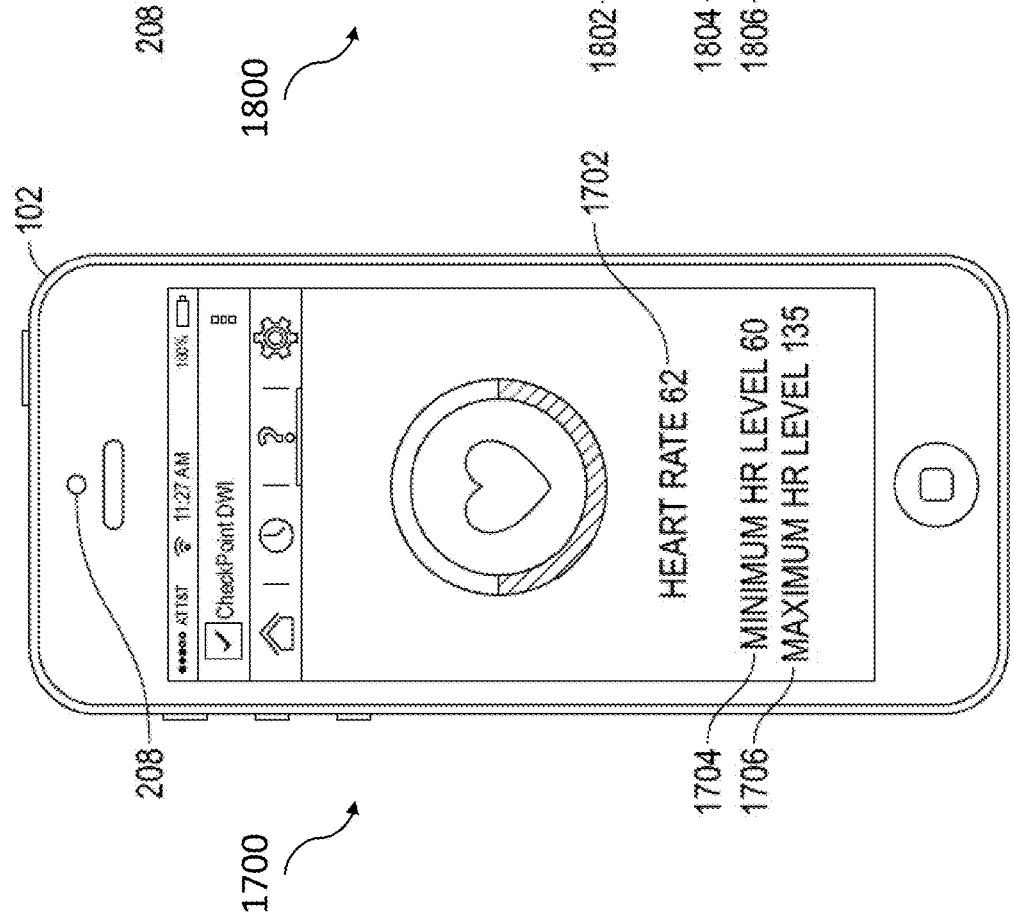
Figure 19:
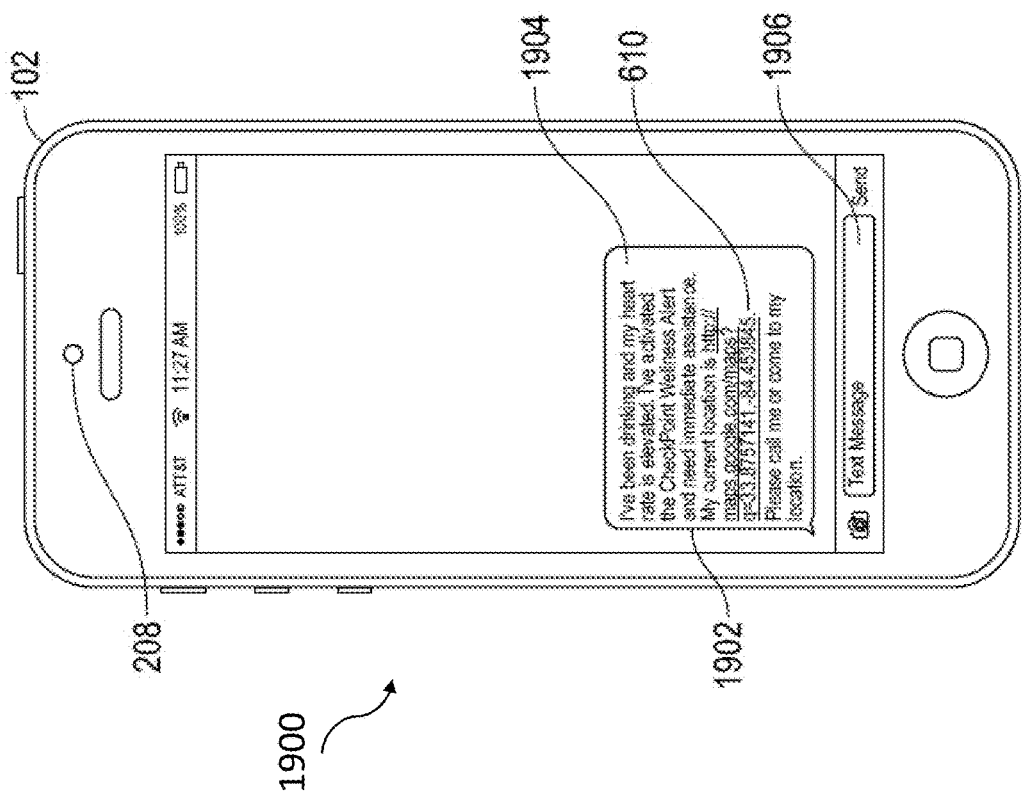

FIGS. 17-19 illustrate examples of user interfaces 1700, 1800,1900 on the user device 102 operated by the user 112 upon activation of the BAC monitoring module 154 from the home screen interface illustrated in FIG. 3 in systems where the safety mobile application utilizes the two measuring devices 120*a,b* illustrated in FIG. 1B. In the present example, the first measuring device 120*a* is a breathalyzer configured to measure a user's BAC and the second measuring device 120*b* is a heart rate monitor configured to measure a heart rate of the user 112; however the disclosure of the breathalyzer and heart rate monitor should not be considered limiting on the current disclosure as the measuring devices 120*a,b* may be any desirable type of measuring device. Similar to FIGS. 2 and 3, the labels and placement of interface elements are representative only and that the importance is on their underlying functions. Likewise, it should be understood that any buttons can be physically moveable switches, softkeys, proximity switches, voice detectors, motion sensor, etc. operable to perform a function in response to user's desires.

In various examples, if the BAC monitoring module 154 determines that the first type of user data received from the first measuring device 120*a* during a first measuring period is below or above a predetermined threshold for the first type of user data, the BAC monitoring module 154 may initiate a second measuring period during with the second measuring device 120*b* to monitor the second type of user data. By way of example, if the BAC monitoring module 154 determines that the BAC of the user 112 is above a predefined threshold, the BAC monitoring module 154 initiates a second measuring period during which the heart rate of the user 112 is monitored.

Upon completion of the second measuring period, the BAC monitoring module 154 determines whether the second type of user data is below or above a predetermined threshold for the second type of user data. Depending on the type of data and the threshold for that data, the BAC monitoring module 154 may automatically transmit a message to the hero 114. The alert message to the hero 114 may include the results of the first type of user data and the results of the second type of user data, as described in greater detail below.

FIG. 17 illustrates the user interface 1700a presented to the user 112 on the user device 102 after the BAC monitoring module 154 had determined that the first type of user data was below or above a predetermined threshold for the first type of user data and after the conclusion of a second measuring period. As illustrated in FIG. 17, the user interface 1700 may include an average 1702 of the second type of user data and various other levels 1704,1706 of the second type of user data. FIG. 18 illustrates the user interface 1800 including an average 1802 of the second type of user data and various other levels 1804,1806 of the second type of user data.

FIG. 19 illustrates an alert message 1902 automatically generated by the BAC monitoring module 154 and sent from the user device 102 to the hero 106. In various examples, the alert message 1902 is automatically generated after the BAC monitoring module 154 determines that the first type of user data is above or below a predetermined threshold for the first type of user data and that the second type of user data is above or below a predetermined threshold for the second type of user data. In various examples, the content of the alert message 1902 is automatically generated by the BAC monitoring module 154; however, in various other examples, the content of the alert message 1902 is customizable by the user 112.

As illustrated in FIG. 19, in various examples, the content of the alert message 1902 includes an indication 1904 that assistance is needed by the user 112 because the two types of user data are above or below the predefined thresholds, respectively. In various examples, the alert message 1902 also includes identifying information similar to that described above. As illustrated in FIG. 19, in various examples, the message includes the location information 610 of the user device 102. As illustrated in FIG. 19, the BAC monitoring module 154 may further provide customizable texting functionality 1906 that the user 112 may engage to create a customized message to the hero 114.

In various other examples, the BAC monitoring module 154 will concurrently receive the first type and second type of user data as measured during a measuring period. In these examples, the status report messages 602 may include the first type and the second type of user data as measured during the measuring period. In various examples, an alert message similar to the alert message 1902 may be generated if either the first type of user data is below or above the predetermined threshold for the first type of user data or the second type of user data is below or above the predetermined threshold for the second type of user data.

FIG. 20 illustrates an example of a method 2000 for monitoring a safety condition of a user 112 with a safety mobile application. The method 2000 is performable and executable on a computing device such as those described above with reference to FIG. 1. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. In various examples, the method 2000 is implemented by the BAC monitoring module 154.

In various examples, at step 2002, the method 2000 includes instructing the user 112 to start using the measuring device 120. In various examples, instructing the user 112 to start using the measuring device 120 includes enabling the user 112 to begin a measuring period with the measuring device 120. In various examples, prior to step 2002, the method 2000 may include enabling the user 112 to log in to the mobile safety application on the user device 102. In various examples, prior to step 2002, the method 2000 may also include enabling the user 112 to select or input a hero 114 with the mobile safety application. At step 2004, in various examples, the method 2000 includes starting a measuring period. In step 2006, the method 2000 includes starting a multimedia activity. In various examples, starting the multimedia activity may be selected from the group including starting to record the video 402 of the user 112 using the user device 102, taking pictures of the user 112 using the user device 102, recording an audio recording of the user 112 using the user device 102, and various other similar activities.

In step 2008, it is determined whether the measuring period has expired. If the measuring period has not expired, the method 2000 continues to step 2010 where recording of the video 402 of the user 112 using the measuring device 120 continues. If the measuring period has expired in step 2008, in step 2012, the method 2000 includes receiving user data about the user 112 using the measuring device 120 during the measuring period from the measuring device 120. In step 2014, the method 2000 includes marking and providing identifying information for the user data and sending the user data to the safety server 104. In various examples, the method 2000 at step 2014 further includes providing the video 402 of the user 112 during the measuring period with identifying information and sending the video 402 to the safety server 104. In step 2016, the method 2000 includes sending a status report to the hero 114. The status report includes at least the user data and accompanying identifying information. In various examples, the method 2000 at step 2016 further includes sending the video 402 of the user 112 to the hero 106. In various examples, in step 2016, the message may further include an audio recording of the user 112 from the measuring period, a picture 704 of the user 112 from the measuring period, location information 610 of the user device 102, or any other identifying information as described above.

FIG. 21 illustrates another example of a method 2100 for monitoring a safety condition of a user 112 with a safety mobile application. The method 2100 is performable and executable on a computing device such as those described above with reference to FIG. 1. It should be noted that any of the steps of any of the methods described herein may be performed in any order or could be performed in sub-steps that are done in any order or that are separated in time from each other by other steps or sub-steps, and the disclosure of a particular order of steps should not be considered limiting on the current disclosure. In various examples, the method 2100 is implemented by the emergency module 156.

In various examples, at step 2102, the method 2100 includes receiving from a user 112 an indication of an emergency situation. In various examples, as described above, the safety mobile application receives an indication of an emergency situation when the user 112 selects the panic element 308. In various examples, prior to step 2102, the method 2100 may include enabling the user 112 to log in to the safety mobile application on the user device 102. In various examples, prior to step 2102, the method 2100 may also include enabling the user 112 to select or input a hero 114 with the safety mobile application. At step 2104, in various examples, the method 2100 includes starting an internal clock for an emergency time period. In step 2106, the method 2100 includes recording the safety video 1302 of the user 112 in the emergency situation after receiving the indication of the emergency situation. In various other examples, at step 2106, the method 2100 further includes recording an audio recording and/or a picture 704 of the user 112 in the emergency situation. At step 2108, the method 2100 includes determining the geolocation of the user device 102 after receiving the indication of the emergency situation. At step 2110, in various examples, the method 2100 includes communicating an alert message 1502 to the hero 114. The alert message 1502 includes the geolocation of the user device 102 and the safety video 1302 of the user 112 to the hero 106. In various examples, at step 2110, the message may further include an audio recording of the user 112 in the emergency situation, a picture 704 of the user 112 in the emergency situation, or any other information as described above.

In step 2112, it is determined whether another indication of an emergency situation has been received from the user 112. If another indication of an emergency situation has been received from the user 112, the method 2100 returns to step 2106. If another indication of an emergency situation has not been received, in step 2114 it is determined whether the location of the user device 102 has changed. If the location of the user device 102 has changed, the method 2100 returns to step 2106. If the location of the user device 102 has not changed, in step 2116 it is determined whether the emergency period has ended. If the emergency period has not ended, the method 2100 returns to step 2112. If the emergency period has ended, in step 2118 the method 2100 includes sending a follow-up message 1602 to the user device 102.

In various examples, the safety mobile application may utilize input from multiple measuring devices 120a,b, as illustrated for example in FIG. 1B. In these examples, each measuring device 120a,b may measure a different type of user data during the measuring period. For example, the first measuring device 120a may measure a first type of user data during the measuring period and the second measuring device 120b may measure a second type of user data during the measuring period.

One should note that conditional language, such as, among others, "can," "could," "might," or "may," unless specifically stated otherwise, or otherwise understood within the context as used, is generally intended to convey that certain examples include, while other examples do not include, certain features, elements and/or steps. Thus, such conditional language is not generally intended to imply that features, elements and/or steps are in any way required for one or more particular examples or that one or more particular examples necessarily include logic for deciding, with or without user input or prompting, whether these features, elements and/or steps are included or are to be performed in any particular example.

It should be emphasized that the above-described examples are merely possible examples of implementations, merely set forth for a clear understanding of the principles of the present disclosure. Any process descriptions or blocks in flow diagrams should be understood as representing modules, segments, algorithms, or portions of code which include one or more executable instructions for implementing specific logical functions or steps in the process, and alternate implementations are included in which functions may not be included or executed at all, may be executed out of order from that illustrated or discussed, including substantially concurrently or in reverse order, depending on the functionality involved, as would be understood by those reasonably skilled in the art of the present disclosure. Many variations and modifications may be made to the above-described example(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A system for monitoring a safety condition of a user, the system comprising:
    a hero device associated with a hero;
    a first measuring device and a second measuring device, each measuring device configured to measure biometric data of the user; and
    a mobile device, the mobile device comprising a processor and a memory device, the memory device configured to store a safety mobile application enabling the mobile device to:
        record a video recording of the user using the first measuring device during a measuring period,
        receive, from the first measuring device, a first type of user data measured by the first measuring device of the user during the measuring period,
        receive, from the second measuring device, a second type of user data measured by the second measuring device,
        transmit, to a server, the first type of user data, the second type of user data, and the video recording of the user from the measuring period,
        determine whether the first type of user data is above a predetermined threshold, and
        responsive to a determination that the first type of user data is above a predetermined threshold, automatically transmit, to the hero device, an alert message comprising the first type of user data, the second type of user data, and the video recording,
        wherein the predetermined threshold is a first predetermined threshold, and wherein the safety mobile application further enables the mobile device to determine whether the second type of user data is above a second predetermined threshold.

2. The system of claim 1, wherein the first measuring device is a breathalyzer.

3. The system of claim 1, wherein the safety mobile application further enables the mobile device to:
    receive, from the user, a request for assistance from the hero; and
    transmit, to the hero device, a request message for assistance from the hero, the request message having the first type of user data, the video recording of the user from the measuring period, and a geolocation of the mobile device.

4. The system of claim 1, wherein the safety mobile application further enables the mobile device to determine a geolocation of the mobile device, wherein the alert message transmitted to the hero device further includes the geolocation of the mobile device.

5. The system of claim 1, wherein the hero is associated with a predetermined contact selectable on the mobile device.

6. The system of claim 1, wherein the alert message includes user identification information.

7. The system of claim 6, wherein the user identification information includes at least one of a time stamp and a date stamp.

\* \* \* \* \*